United States Patent
Ghim et al.

(10) Patent No.: US 10,959,195 B2
(45) Date of Patent: Mar. 23, 2021

(54) ELECTRONIC DEVICE AND METHOD FOR CONTROLLING TRANSMIT POWER IN DEVICE-TO-DEVICE COMMUNICATION

(71) Applicant: Samsung Electronics Co., Ltd., Suwon-si (KR)

(72) Inventors: Jae-Gon Ghim, Hwaseong-si (KR); Namwoo Kim, Hwaseong-si (KR); Jongsam Park, Suwon-si (KR); Hwi Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/944,378

(22) Filed: Apr. 3, 2018

(65) Prior Publication Data
US 2018/0288716 A1    Oct. 4, 2018

(30) Foreign Application Priority Data

Apr. 3, 2017    (KR) .......................... 10-2017-0042853

(51) Int. Cl.
*H04W 52/48*    (2009.01)
*H04W 52/38*    (2009.01)

(52) U.S. Cl.
CPC ......... *H04W 52/48* (2013.01); *H04W 52/383* (2013.01)

(58) Field of Classification Search
CPC .................................................. H04W 52/383
See application file for complete search history.

(56) References Cited

U.S. PATENT DOCUMENTS

| | | | |
|---|---|---|---|
| 5,584,057 A * | 12/1996 | Dent ................... | H04B 7/0671 455/101 |
| 2003/0235160 A1 | 12/2003 | Saifuddin | |
| 2005/0058154 A1* | 3/2005 | Lee ...................... | H04L 1/1825 370/473 |
| 2005/0227721 A1* | 10/2005 | Nakao .................. | H04W 52/48 455/510 |
| 2010/0215111 A1* | 8/2010 | Filipovic .............. | H04B 7/0608 375/267 |
| 2011/0263294 A1* | 10/2011 | Kim .................. | H04W 52/0296 455/558 |
| 2012/0213156 A1 | 8/2012 | Liu | |

(Continued)

FOREIGN PATENT DOCUMENTS

EP    2950595 A1    12/2015
EP    3141049 A1    3/2017

(Continued)

OTHER PUBLICATIONS

International Search Report regarding International Application No. PCT/KR2018/003847, dated Jul. 13, 2018, 5 pages.

(Continued)

*Primary Examiner* — Hsinchun Liao

(57) ABSTRACT

An electronic device according to various embodiments may include at least one transceiver, and at least one processor, operatively coupled to the at least one transceiver, configured to control to transmit, via a device-to-device (D2D) communication path to at least another electronic device, a signal with a first transmit (Tx) power, and control to re-transmit, via the D2D communication path to the at least another electronic device, the signal with a second Tx power lower than the first Tx power.

20 Claims, 16 Drawing Sheets

(56) References Cited

U.S. PATENT DOCUMENTS

| | | |
|---|---|---|
| 2015/0373651 A1 | 12/2015 | Ryu et al. |
| 2016/0073349 A1* | 3/2016 | Mohan .............. H04W 52/0251 455/426.1 |
| 2016/0150391 A1 | 5/2016 | Lee et al. |
| 2016/0234789 A1 | 8/2016 | Oh et al. |
| 2017/0013648 A1 | 1/2017 | Jung et al. |
| 2017/0155434 A1 | 6/2017 | Kim et al. |
| 2017/0230918 A1 | 8/2017 | Ryu et al. |
| 2018/0007726 A1 | 1/2018 | Li et al. |

FOREIGN PATENT DOCUMENTS

| | | |
|---|---|---|
| JP | 2013-515383 A | 5/2013 |
| KR | 10-2014-0101316 A | 8/2014 |
| KR | 10-1465901 B1 | 11/2014 |
| KR | 10-2015-0128520 A | 11/2015 |
| KR | 10-2016-0016489 A | 2/2016 |
| KR | 10-2016-0096798 A | 8/2016 |
| WO | 2015170937 A1 | 11/2015 |
| WO | 2016018094 A1 | 2/2016 |
| WO | 2016022065 A1 | 2/2016 |
| WO | 2016145665 A1 | 9/2016 |

OTHER PUBLICATIONS

Supplementary European Search Report in connection with European Application No. 18781457.9 dated Mar. 18, 2020, 7 pages.
Communication pursuant to Article 94(3) EPC in connection with European Application No. 18781457.9 dated Oct. 14, 2020, 5 pages.

\* cited by examiner

ELECTRONIC DEVICE AND METHOD FOR CONTROLLING TRANSMIT POWER IN DEVICE-TO-DEVICE COMMUNICATION

CROSS-REFERENCE TO RELATED APPLICATION(S)

This application is based on and claims priority under 35 U.S.C. § 119 to Korean Patent Application No. 10-2017-0042853 filed on Apr. 3, 2017 in the Korean Intellectual Property Office, the disclosure of which is incorporated herein by reference in its entirety.

TECHNICAL FIELD

The present disclosure relates generally to an electronic device. More particularly, the present disclosure relates to an electronic device and a method for controlling a transmit power in a device-to-device (D2D) communication.

BACKGROUND

Electronic devices capable of performing device-to-device (D2D) communication for public safety or vehicle to everything (V2X) are released. Such D2D communication does not need a base station, and thus achieves a required reception rate mostly using a retransmission scheme. However, since the retransmission scheme demands higher power consumption than a typical transmission scheme, what is demanded is a solution for reducing the power consumption of the retransmission in the D2D communication.

SUMMARY

To address the above-discussed deficiencies, it is a primary aspect of the present disclosure to provide an electronic device and an operation method for controlling a transmit power so as to reduce power consumption of retransmission in a device-to-device (D2D) communication.

According to one aspect of the present disclosure, an electronic device according to various embodiments may include at least one transceiver, and at least one processor, operatively coupled to the at least one transceiver, configured to control to transmit, via a device-to-device (D2D) communication path to at least another electronic device, a signal with a first transmit (Tx) power, and control to re-transmit, via the D2D communication path to the at least another electronic device, the signal with a second Tx power lower than the first Tx power.

According to another aspect of the present disclosure, a method of an electronic device may include transmitting, via a D2D communication path to at least another electronic device, a signal with a first Tx power, and re-transmitting, via the D2D communication path to the at least another electronic device, the signal with a second Tx power lower than the first Tx power.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
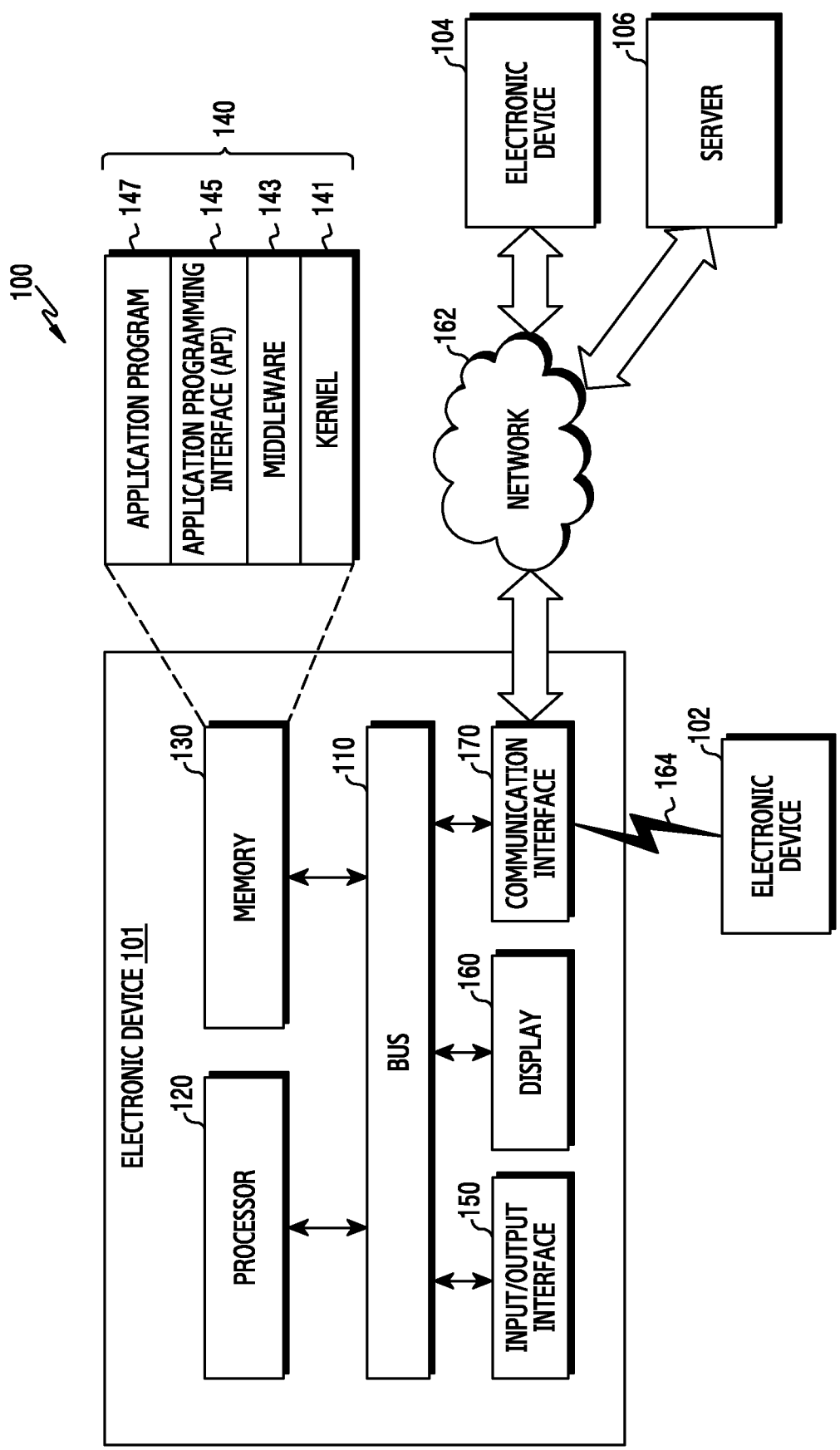
FIG. 1 illustrates an example of a network environment including an electronic device according to various embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the application programs 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short-range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
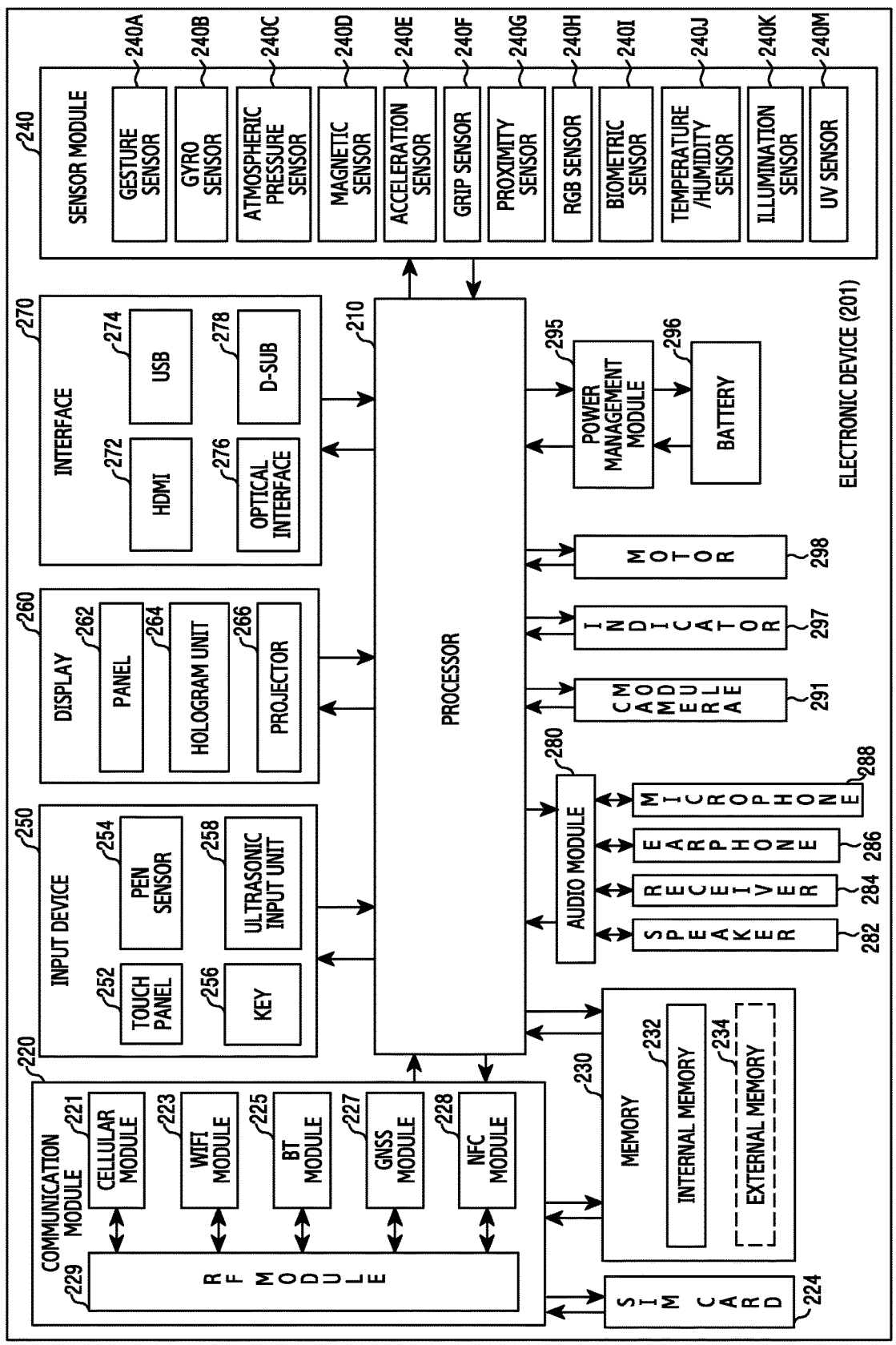
FIG. 2 illustrates a block diagram of an electronic device according to various embodiments.

FIG. 2 is a block diagram of an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the processor 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMedia- Card (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO®.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
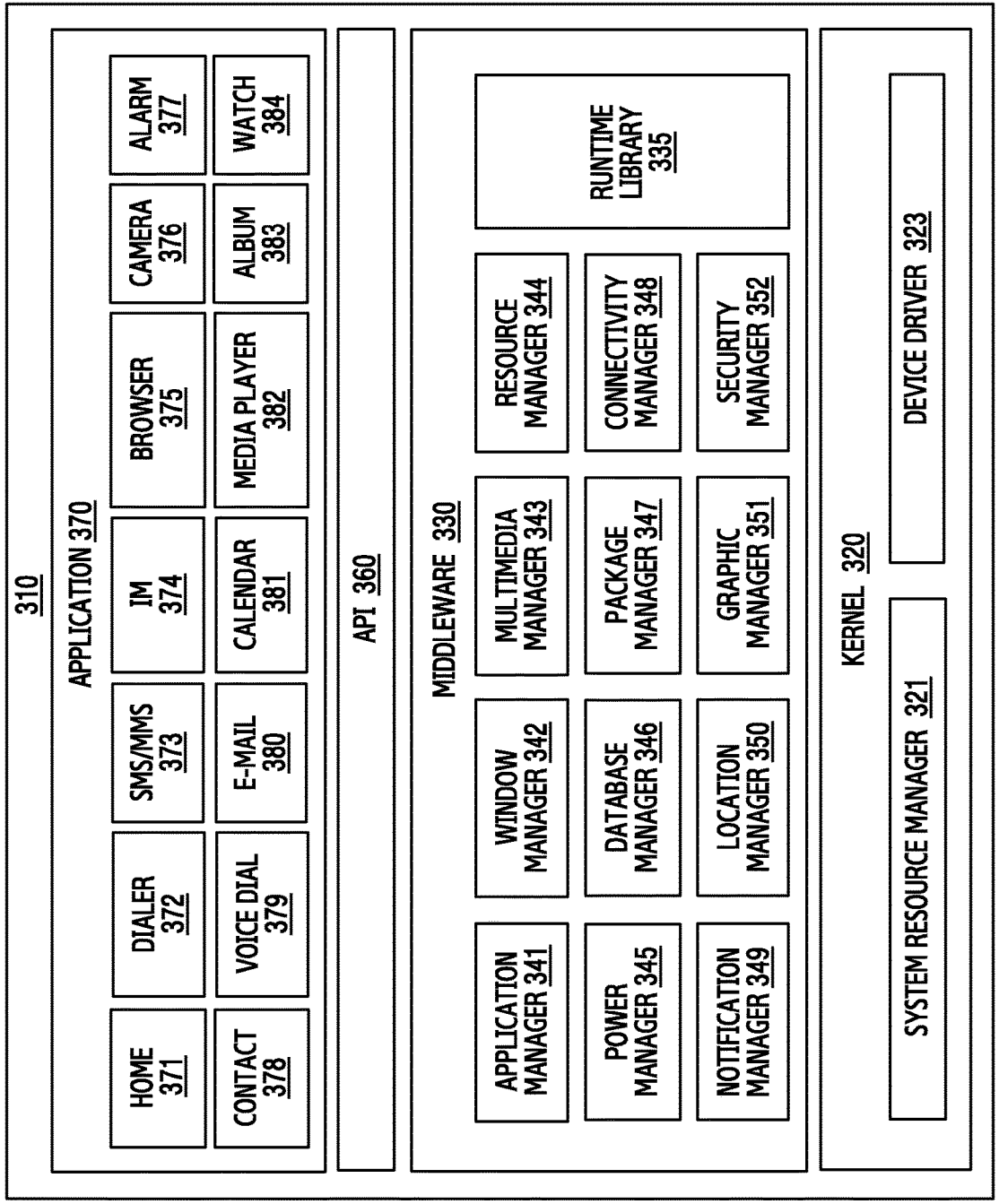
FIG. 3 illustrates a block diagram of a program module according to various embodiments.

FIG. 3 illustrates a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android®, iOS®, Windows®, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

For example, the middleware 330 may provide a function used in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format used for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like used for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions used for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a watch 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a unit of an integrated component element or a part thereof. The "module" may be a unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

As mentioned above, an electronic device according to various embodiments may include at least one transceiver, and at least one processor, operatively coupled to the at least one transceiver, configured to control to access a base station in at least one frequency band including a transmit (Tx) frequency band and a receive (Rx) frequency band, control to transmit, via a device-to-device (D2D) communication path to at least another electronic device, a signal with a first Tx power in the Tx frequency band, and, if the signal is retransmitted one or more times, control to re-transmit, via the D2D communication path to the at least another electronic device, the signal with a second Tx power lower than the first Tx power in the Tx frequency band.

In some embodiments, the at least one processor may be configured to control to re-transmit, via the D2D communication path to the at least another electronic device, the signal with the second Tx power if a remaining amount of a battery of the electronic device is less than a reference value. The at least one processor may be further configured to re-transmit, via the D2D communication path to the at least another electronic device, the signal with the first Tx power if the remaining amount of the battery of the electronic device is greater than or equal to the reference value.

In some embodiments, the at least one processor may be configured to re-transmit, via the D2D communication path to the at least another electronic device, the signal with the second Tx power, based on operating in a state where the electronic device is not accessed to a base station. The at least one processor may be further configured to re-transmit, via the D2D communication path to the at least another electronic device, the signal with the first Tx power, based on operating in a state where the electronic device is accessed to the base station.

In some embodiments, the at least one processor may be further configured to re-transmit the signal with the second Tx power if a received signal strength from the at least another electronic device exceeds a threshold.

In some embodiments, the at least one processor may be further configured to re-transmit the signal with the second Tx power, if a distance between the electronic device and the at least another electronic device is less than a reference distance. The at least one processor may be further configured to determine the distance, based on another signal received via the D2D communication path from the at least another electronic device, and re-transmit the signal with the first Tx power, if the distance is greater than or equal to the reference distance. The another signal may include information regarding a timing at which the at least another electronic device transmits the another signal, and the at least one processor may be configured to determine the distance, based on the information regarding the timing. The another signal may include information for indicating an area within which the at least another electronic device is located, and the at least one processor may be configured to determine the distance, based on the information for indicating the area. The another signal may include information for indicating a transmitted signal strength of the another electronic device, and the at least one processor may be configured to determine the distance, based on a difference value between the transmitted signal strength and a received signal strength of the another signal.

In some embodiments, the signal may include control information regarding user data to be transmitted to at least another electronic device via the D2D communication path. The signal may be transmitted with the first Tx power over a physical sidelink control channel (PSCCH) and retransmitted with the second Tx power over the PSCCH.

In some embodiments, the signal may include user data. The signal may be transmitted with the first Tx power over a physical sidelink shared channel (PSSCH) and retransmitted with the second Tx power over the PSSCH.

In some embodiments, the signal may include control information regarding user data to be transmitted to at least another electronic device, and the at least one processor may be further configured to transmit another signal including the user data to the at least another electronic device with a third Tx power via the D2D communication path, and control to retransmit another signal including the user data to the at least another electronic device via the D2D communication path with a fourth Tx power which is lower than the third power. The third Tx power may be lower than the first Tx power, and the fourth Tx power may be lower than the second Tx power.

Figure 4:
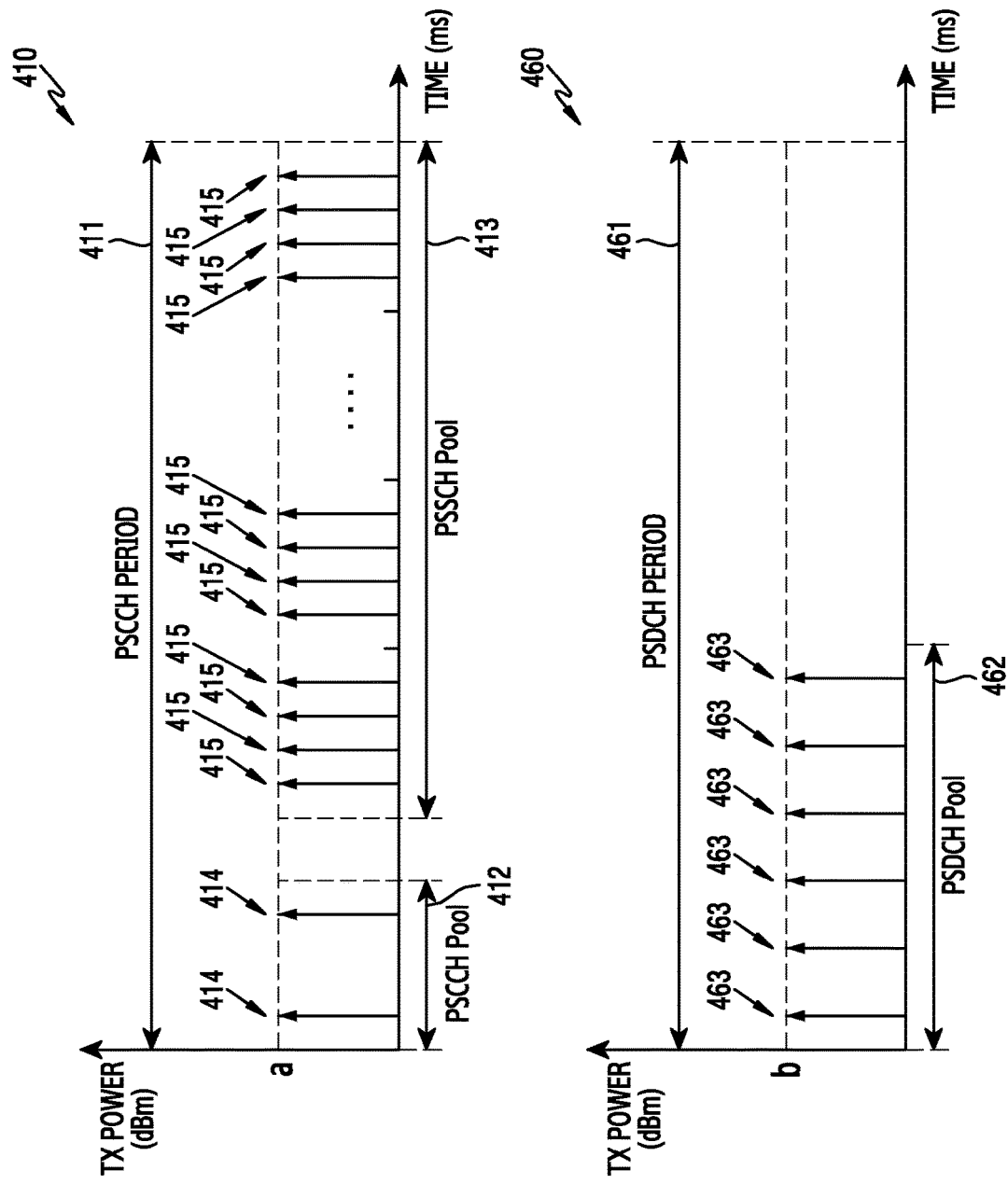
FIG. 4 illustrates typical retransmission in device-to-device (D2D) communication.

FIG. 4 illustrates typical retransmission in D2D communication.

In FIG. 4, a horizontal axis of a graph 410 and a graph 460 indicates time, and a unit of the horizontal axis of the graph 410 and the graph 460 may be millisecond (ms). A vertical axis of the graph 410 and the graph 460 indicates a Tx power, and a unit of the vertical axis of the graph 410 and the graph 460 may be decibel-milliwatts (dBm).

Referring to FIG. 4, the graph 410 shows relationship between a D2D signal transmitted according to LTE specification and the Tx power, in a PSCCH period 411. The PSCCH period 411 may be separate subframe pools for control information transmitted over the PSCCH and user data transmitted over the PSSCH in the D2D communication. The PSCCH period 411 may be referred to as a sidelink control (SC) period or a Scheduling Assignment (SA) period.

In the graph 410, a signal 414 is transmitted two times with a fixed Tx power a (dbM) in a PSCCH pool 412 assigned for the control information. In the graph 410, a signal 415 is transmitted 4N times with the fixed Tx power a (dbM) in a PSCCH pool 413 assigned for the user information. Namely, the signal 414 and the signal 415 are retransmitted to obtain a reception rate.

Since the signal 414 and the signal 415 are transmitted with the fixed Tx power a regardless of the number of the retransmissions, the electronic device which transmits the signal 414 and the signal 415 may consume higher power in the retransmission. Also, if the at least another electronic device which receives the signal 414 and the signal 415 is close to the electronic device, the at least another electronic device may not achieve the required reception rate, due to packet error caused when the fixed Tx power a exceeds an available Rx power of the at least another electronic device. In addition, since the signal 414 and the signal 415 are repeatedly transmitted with the fixed Tx power a, they may cause interference to a base station or an electronic device near the electronic device or the at least another electronic device.

The graph 460 shows relationship between a D2D discovery signal transmitted according to the LTE specification in a PSDCH period 461, and the Tx power. The PSDCH period 461 may be separate subframe pools for the discovery signal transmitted over the PSDCH in D2D discovery.

In the graph 460, a signal 463 is transmitted N times with a fixed Tx power b (dBm) in a PSDCH pool 462. That is, the signal 463 is retransmitted to achieve the reception rate.

Since the signal 463 is transmitted with the fixed Tx power b regardless of the number of the retransmissions, the electronic device which transmits the signal 463 may consume higher power in the retransmission. Also, if the at least another electronic device which receives the signal 463 is close to the electronic device, the at least another electronic device may not achieve the required reception rate, due to packet error caused when the fixed Tx power b exceeds the available Rx power of the at least another electronic device. In addition, since the signal 463 is repeatedly transmitted with the fixed Tx power b, it may cause interference to a base station or an electronic device near the electronic device or the at least another electronic device.

As stated above, the signal transmission defined by the current LTE specification may cause the relatively high power consumption or the interference to devices which are irrelevant to the D2D communication. In addition, the signal transmission defined by the current LTE specification, which is to obtain the reception rate, may not achieve the reception rate due to the absence of the Tx power control.

Thus, various embodiments provide an electronic device and a method for reducing power consumption of the electronic device which retransmits a signal and mitigating interference on devices which are irrelevant to D2D communication, by controlling a Tx power used in the retransmission. Also, various embodiments of the present disclosure provide an electronic device and a method for improving the reception rate, by controlling the Tx power used in the retransmission.

Electronic devices capable of performing D2D communication in cellular communication for public safety or vehicle to everything (V2X) are released. Such D2D communication is performed without intervention of a relay node such as a base station, and accordingly is subject to limitations in error control such as hybrid automatic repeat request (HARQ). Since the electronic device without the error control cannot guarantee the reception rate, the LTE specification defines a scheme which retransmits the same signal, instead of the error control, in order to obtain the reception rate. For example, the LTE specification defines the D2D communication, wherein the control information is retransmitted twice with one fixed Tx power over the PSCCH, and the user data is retransmitted 4N times with the fixed Tx power over the PSSCH.

However, as defined in the LTE specification, the electronic device which retransmits the same signal with the fixed Tx power may consume higher power in the retransmission. Also, if the fixed transmit power is higher than an available Rx power of another electronic device which receives the signal from the electronic device via the D2D communication path, packet error may occur in the another electronic device. In other words, if the fixed transmit power is higher than the available Rx power of the another electronic device which receives the signal from the electronic device via the D2D communication path, the required reception rate may not be achieved due to the available Rx power in spite of the retransmission. Also, the signal retransmitted with the fixed Tx power may cause interference for an electronic device or a base station near the electronic device or the another electronic device. That is, a solution for controlling the Tx power used in the signal retransmission is demanded.

Hence, various embodiments of the present disclosure provide an electronic device and a method for adaptively determining a Tx power level used for signal retransmission. Also, various embodiments of the present disclosure provide an electronic device and a method for adaptively determining a Tx power level used for signal retransmission based on a state of the electronic device.

Figure 5:
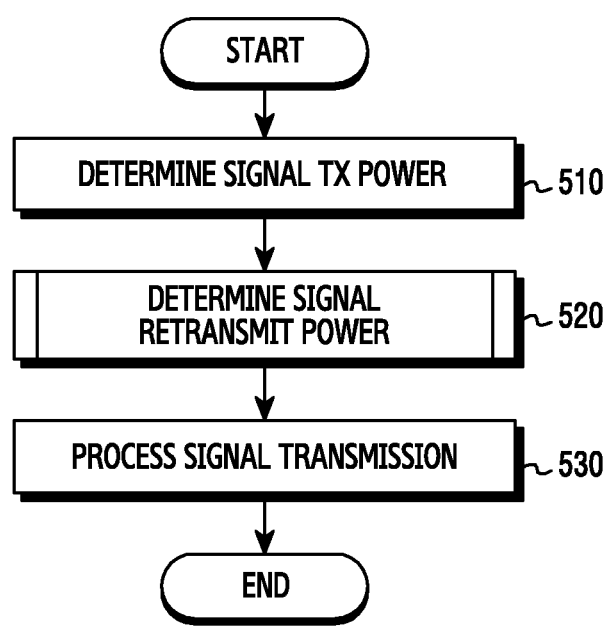
FIG. 5 illustrates operations of an electronic device according to various embodiments.

FIG. 5 illustrates operations of an electronic device according to various embodiments. Such operations may be executed by the electronic device 101 of FIG. 1 or the processor 120 of the electronic device 101.

Referring to FIG. 5, in operation 510, the electronic device 101 may determine a Tx power of a signal. The electronic device 101 may determine the Tx power of a signal to be transmitted to at least another electronic device (e.g., the electronic device 104 of FIG. 1) via a D2D communication path. The determined Tx power may be a Tx power used to initially transmit (i.e., not used for the signal retransmission) a signal from the electronic device 101 to the at least another electronic device via the D2D communication path.

In some embodiments, the electronic device 101 may operate in a state fully connected to a cellular network, such as a radio resource control (RRC) connection state. If the electronic device 101 operates in the state fully connected to the cellular network, the electronic device 101 may conduct D2D communication with the at least another electronic device, based on a resource (e.g., a resource allocated through downlink control information (DCI) format 5) allocated from a serving base station of the electronic device 101. For example, if the electronic device 101 operates in the state fully connected to the cellular network, the electronic device 101 may determine the Tx power, based on resource information for the D2D communication receive from the serving base station. For example, if the received resource information for the D2D communication includes data indicating that the signal is transmitted to the at least another electronic device with a maximum Tx power via the D2D communication path, the electronic device 101 may determine the maximum Tx power as the signal Tx power. For example, if the received resource information for the D2D communication includes data indicating to determine the signal Tx power based on an open-loop (OL) power control scheme, the electronic device 101 may determine the signal Tx power based on the OL power control scheme.

In some other embodiments, the electronic device 101 may operate in a state not fully connected to the cellular network, such as a RRC idle state or an out-of-coverage (OOC) state. In the state not fully connected to the cellular network, the electronic device 101 may conduct the D2D communication with the at least another electronic device, based on a resource determined by selection by the electronic device 101 (e.g., autonomous selection). For example, in the state not fully connected to the cellular network, the electronic device 101 may determine the signal Tx power based on Equation 1.

$$P_{TX} = \min\{P_{cmax}, P0 + 10 \log 10(M)\} \quad \text{(Equation 1)}$$

$P_{TX}$ denotes the Tx power, $P_{cmax}$ denotes the maximum Tx power of the electronic device 101 designated by the serving base station of the electronic device 101, P0 denotes a Tx power predetermined by the electronic device 101 for D2D signal transmission, and M denotes the number of resource blocks usable by a terminal for the D2D signal transmission.

In operation 520, the electronic device 101 may determine a retransmit power of the signal. The electronic device 101 may determine the retransmit power of the signal to be retransmitted to the at least another electronic device via the D2D communication path. The retransmit power may be a Tx power used to repeatedly transmit (i.e., not used for the initial signal retransmission) the same signal from the electronic device 101 to the at least another electronic device via the D2D communication path.

The electronic device 101 may determine the retransmit power using various methods according to embodiments.

In some embodiments, the electronic device 101 may determine the retransmit power based on the Tx power determined in operation 510. For example, the electronic device 101 may determine the retransmit power by subtracting a specific value from the Tx power.

In some other embodiments, the electronic device 101 may determine the retransmit power based on the state of the electronic device 101. The electronic device 101 may determine the retransmit power based on the state of the electronic device 101, regardless of the Tx power determined in the operation 510. For example, the electronic device 101 may determine the retransmit power, based on whether the electronic device 101 is fully connected to the cellular network. For example, the electronic device 101 may determine the retransmit power, based on whether a remaining amount of a battery of the electronic device 101 exceeds a reference value. For example, the electronic device 101 may determine the retransmit power, based on whether it operates in proximity to the at least another electronic device. For example, the electronic device 101 may determine the retransmit power, based on whether a traffic amount of at least one of the base station accessed by the electronic device 101, an electronic device near the electronic device 101, a base station accessed by the at least another electronic device, and an electronic device near the at least another electronic device exceeds a reference value.

In some other embodiments, the electronic device 101 may determine the retransmit power, based on a characteristic or an attribute of the signal to retransmit. For example, the electronic device 101 may determine the retransmit power, based on whether the signal is destined for a neighboring terminal. In response to the signal destined for a neighboring terminal, the electronic device 101 may set the retransmit power to a relatively low value. By contrast, in response to a signal destined for a remote terminal, the electronic device 101 may set the retransmit power to a relatively high value. For example, the electronic device 101 may determine the retransmit power, based on whether the signal is destined for a specific electronic device or a plurality of unspecified electronic devices.

The electronic device 101 may determine the level of the retransmit power using various methods according to embodiments.

In some embodiments, the electronic device 101 may determine one of one or more fixed values for the retransmit power, as the retransmit power level. For example, the electronic device 101 may determine one, which corresponds to the state of the electronic device 101, of the one or more fixed values $a_1, a_2, \ldots, a_n$, as the retransmit power level. For example, the electronic device 101 may determine one, which corresponds to the characteristic of the signal to be retransmitted, of the one or more fixed values $b_1, b_2, \ldots, b_n$, as the retransmit power level.

In some other embodiments, the electronic device 101 may calculate the retransmit power level based on a particular criterion. For example, the electronic device 101 may determine the retransmit power level with a value corresponding to the state of the electronic device 101 using an equation or an algorithm. For example, the electronic device 101 may determine the retransmit power level with the value corresponding to the characteristic of the signal to be retransmitted, using an equation or an algorithm.

An identical retransmit power level may be set regardless of the number of the retransmissions, or the retransmit power level may vary based at least in part on the retransmission count. For example, the electronic device 101 may set the initial Tx power to a (dBm), a first retransmit power to b (dBm), a second retransmit power to b (dBm), and a third retransmit power to b (dBm). For example, the electronic device 101 may set the initial Tx power to a (dBm), the first retransmit power to b (dBm), the second retransmit power to b (dBm), and the third retransmit power to b (dBm). For example, the electronic device 101 may set the initial Tx power to a (dBm), the first retransmit power to a (dBm), the second retransmit power to b (dBm), and the third retransmit power to c (dBm). For example, the electronic device 101 may set the initial Tx power to a (dBm), the first retransmit power to b (dBm), the second retransmit power to b (dBm), and the third retransmit power to c (dBm).

In FIG. 5, the operation 510 and the operation 520 are separate for the sake of explanations. According to embodiments, the operation 510 and the operation 520 may be executed at the same time or in any order. According to various embodiments, the operation 510 and the operation 520 may be executed when the electronic device 101 initiates the D2D communication.

In operation 530, the electronic device 101 may process the signal transmission. The electronic device 101 may transmit the signal to the at least another electronic device with the determined Tx power via the D2D communication path, and retransmit the signal with the determined retransmit power.

The electronic device 101 may transmit the signal over various channels. For example, the electronic device 101 may transmit the signal over the PSCCH. For example, the electronic device 101 may transmit the signal over the PSSCH. For example, the electronic device 101 may transmit the signal over the PSDCH.

The signal may contain various information or various data. For example, the signal may include control information or sidelink control information (SCI) for user data to be transmitted. The control information may include at least one of parameters of Table 1.

TABLE 1

Group destination identifier ~
Modulation and Coding Scheme ~
Resource block assignment and hopping resource allocation ~
Frequency hopping flag ~
Time Resource Pattern ~
Timing advance ~

In Table 1, "group destination identifier" is information indicating a group of the electronic device 101, "Modulation and Coding Scheme" is information indicating an MCS value of the user data to be transmitted, "Resource block assignment and hopping resource allocation", "Frequency hopping flag", and "Time Resource Pattern" are resource information of the user data to be transmitted, and "Timing advance" is information indicating a Tx timing of the electronic device 101.

For example, the signal may include the user data. For example, the signal may include the control information and the user data. For example, the signal may include information (e.g., announcement) indicating the presence of the electronic device 101.

The signal may be retransmitted one or more times. For example, if the signal is the control information transmitted over the PSCCH, the signal may be retransmitted one time (i.e., considering the initial transmission, two times in total). For example, if the signal is the user data transmitted over the PSSCH, the signal may be retransmitted 4N−1 times (i.e., considering the initial transmission, 4N times in total).

As such, the electronic device 101 according to various embodiments may separately determine the Tx power and the Rx power, transmit the signal to the at least another electronic device with the determined Tx power via the D2D communication path, and retransmit the signal with the determined retransmit power. Through the operations of FIG. 5, the electronic device 101 may reduce its power consumption. Also, the electronic device 101 may achieve power diversity by repeatedly transmitting the signal with various powers in the operations of FIG. 5. With the power diversity, the at least another electronic device receiving the signal may obtain the reception rate over the required level, regardless of a distance between the electronic device and the at least another electronic device. Further, by reducing the Tx power of at least part of the repetitive transmissions through the operations of FIG. 5, interference of devices near the electronic device 101 or the at least another electronic device may be mitigated. The method for determining the retransmit power or the method for adjusting the retransmit power, which require no additional signaling with another electronic device, may achieve low complexity.

Figure 6A:
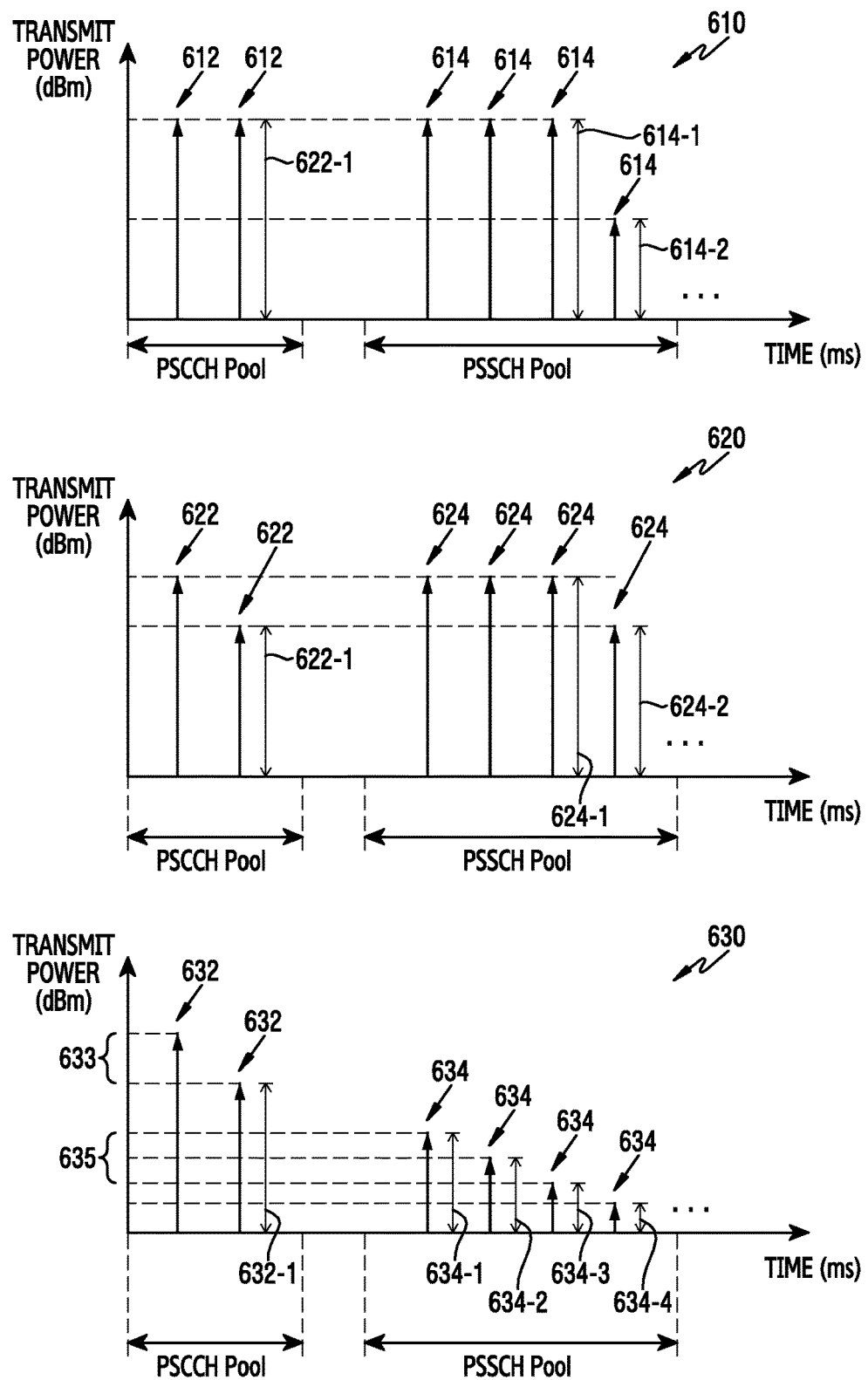
FIG. 6A illustrates retransmission in D2D communication according to various embodiments.

FIG. 6A illustrates retransmission in D2D communication according to various embodiments. The retransmission of FIG. 6A may be executed by the electronic device 101 of FIG. 1.

In FIG. 6A, a horizontal axis of a graph 610, a graph 620, and a graph 630 indicates time, and a unit of the horizontal axis of the graph 610, the graph 620, and the graph 630 may be ms. A vertical axis of the graph 610, the graph 620, and the graph 630 indicates a Tx power, and a unit of the vertical axis of the graph 610, the graph 620, and the graph 630 may be dBm.

Referring to FIG. 6A, the graph 610, the graph 620, and the graph 630 show a TX power of a signal 612, a signal 622, and a signal 632, respectively, including control information transmitted two times through PSCCH pools, and show a Tx power of a signal 614, a signal 624, and a signal 634, respectively, including user data transmitted 4N times through PSSCH pools.

In the graph 610, the electronic device 101 may determine a retransmit power 612-1 of the signal 612 in the operation 520. For example, by considering the signal including the control information alone (i.e., considering a signal type), the electronic device 101 may determine the same retransmit power 612-1 as the Tx power. The electronic device 101 may determine a retransmit power 614-1 of the signal 614 in the operation 520. To reduce the power consumption of the electronic device 101, to mitigate the interference on another electronic device, or to improve the reception rate of the signal 614, the electronic device 101 may determine first two retransmit powers 614-1 (i.e., second and third transmissions) of retransmit powers of the signal 614, to be identical to the Tx power (first transmission) of the signal 614, and determine the last retransmit power 614-2 to be lower than the Tx power of the signal 614.

In the graph 620, the electronic device 101 may determine a retransmit power 622-1 of the signal 622 in the operation 520. For example, to reduce the power consumption of the electronic device 101, to mitigate the interference on another electronic device, or to improve the reception rate of the signal 622, the electronic device 101 may determine the retransmit power 622-1 of the signal 622 to be lower than the Tx power of the signal 622. In the operation 520, the electronic device 101 may determine retransmit powers (e.g., retransmit power 624-1, retransmit power 624-2) of the signal 624. To reduce the power consumption of the electronic device 101, to mitigate the interference on another electronic device, or to improve the reception rate of the signal 624, the electronic device 101 may determine first two retransmit powers 624-1 of the retransmit powers of the signal 624, to be identical to the Tx power of the signal 624, and determine the last retransmit power 624-2 to be lower than the Tx power of the signal 624.

In the graph 630, the electronic device 101 may determine a Tx power of the signal 632 and a retransmit power 632-1 of the signal 632 in the operation 510 and the operation 520. For example, by considering the signal 632 including the control information, the electronic device 101 may determine the Tx power of the signal 632 and the retransmit power 632-1 of the signal 632, to be higher than a Tx power of the signal 634 and retransmit powers (e.g., retransmit power 634-1, retransmit power 634-2, retransmit power 634-3, and retransmit power 634-4) of the signal 634. Also, to reduce the power consumption of the electronic device 101, to mitigate the interference on another electronic device, or to improve the reception rate of the signal 632, the electronic device 101 may determine the retransmit power 632-1 of the signal 632 to be lower than the Tx power of the signal 632. In the operation 510 and the operation 520, the electronic device 101 may determine the Tx power of the signal 634 and retransmit powers (e.g., retransmit power 634-1, retransmit power 634-2, retransmit power 634-3, and retransmit power 634-4) of the signal 634. For example, by considering the signal 634 including the user data, the electronic device 101 may determine the Tx power of the signal 634 and the retransmit powers (e.g., retransmit power 634-1, retransmit power 634-2, retransmit power 634-3, and retransmit power 634-4) of the signal 634, to be lower than the Tx power of the signal 632 and the retransmit power 632-1 of the signal 632. To reduce the power consumption of the electronic device 101 or to mitigate the interference on another electronic device, the electronic device 101 may decrease the retransmit powers (e.g., retransmit power 634-1, retransmit power 634-2, retransmit power 634-3, and retransmit power 634-4) of the signal 634, every time the retransmission count of the signal 634 increases.

Although not depicted in FIG. 6A, in some embodiments, the electronic device 101 may control not only the retransmit power but also the Tx power. For example, if transmitting a D2D communication signal and retransmitting the D2D communication signal, the electronic device 101 may perform initial transmission of the D2D communication signal based on a first Tx power and conduct at least part of the retransmission of the D2D communication signal based on a second Tx power which is higher than the first Tx power. That is, the electronic device 101 according to various embodiments may adaptively determine the Tx power and the retransmit power of the D2D communication signal, based at least in part on a status of the electronic device 101, a state of another electronic device which D2D communicates with the electronic device 101, and a state of a D2D communication path between the electronic device 101 and the another electronic device.

Figure 6B:
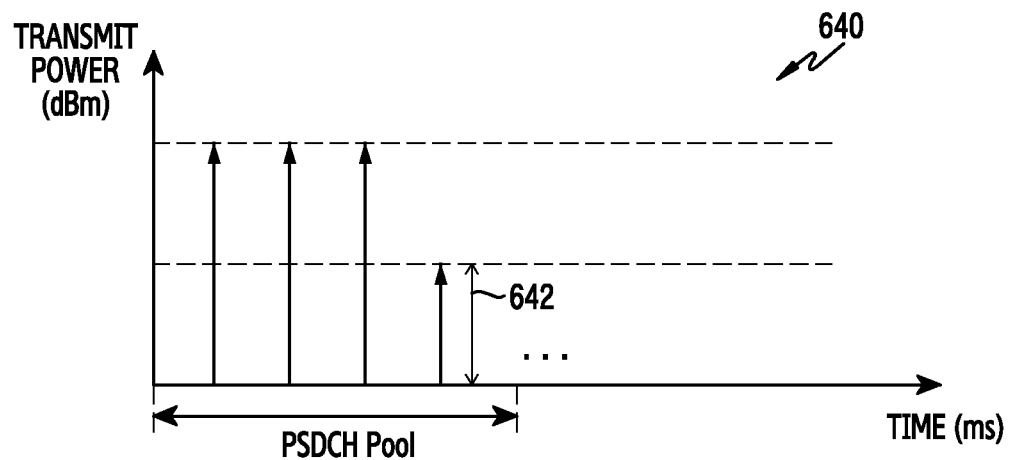
FIG. 6B illustrates retransmission in D2D discovery according to various embodiments.
Figure 6B:
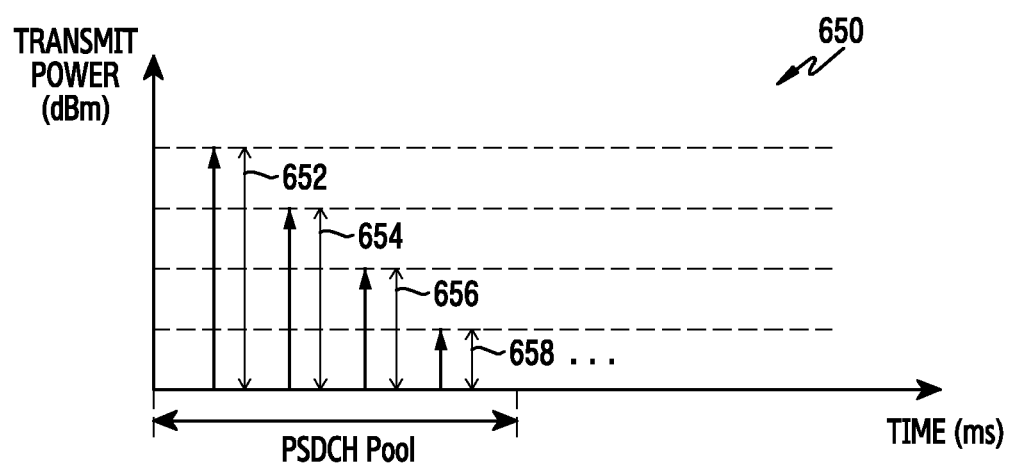

FIG. 6B illustrates retransmission in D2D discovery according to various embodiments. The retransmission of FIG. 6B may be executed by the electronic device 101 of FIG. 1.

In FIG. 6B, a horizontal axis of a graph 640 and a graph 650 indicates time, and a unit of the horizontal axis of the graph 640 and the graph 650 may be ms. A vertical axis of the graph 640 and the graph 650 indicates a Tx power, and a unit of the vertical axis of the graph 640 and the graph 650 may be dBm.

Referring to FIG. 6B, the graph 640 and the graph 650 show the Tx power of a PSDCH signal which is repeatedly transmitted N times through PSDCH pools.

In the graph 640, the electronic device 101 may determine a retransmit power of the PSDCH signal in the operation 520. For example, to reduce the power consumption of the electronic device 101, to mitigate the interference on another electronic device, or to improve the reception rate of the PSDCH signal, the electronic device 101 may determine at least one retransmit power of the retransmit powers of the PSDCH signal, to be lower than the Tx power of the PSDCH signal.

In the graph 650, the electronic device 101 may determine a retransmit power of the PSDCH signal in the operation 520. For example, to reduce the power consumption of the electronic device 101, to mitigate the interference on another electronic device, or to improve the reception rate of the PSDCH signal, the electronic device 101 may sequentially decrease the retransmit powers (e.g., retransmit power 652, retransmit power 654, retransmit power 656, and retransmit power 658) of the PSDCH signal.

As such, by determining the retransmit power of the signal to be transmitted based on various parameters, the electronic device 101 according to various embodiments may reduce its power consumption and improve the reception rate of the signal to be transmitted.

Although not depicted in FIG. 6B, in some embodiments, the electronic device 101 may control not only the retransmit power but also the Tx power. For example, if transmitting a D2D discovery signal and retransmitting the D2D discovery signal, the electronic device 101 may perform initial transmission of the D2D discovery signal based on a first Tx power and conduct at least part of the retransmission of the D2D discovery signal based on a second Tx power which is higher than the first Tx power. That is, the electronic device 101 according to various embodiments may adaptively determine the Tx power and the retransmit power of the D2D discovery signal, based at least in part on the status of the electronic device 101, the state of another electronic device which performs the D2D discovery with the electronic device 101, and the state of a D2D discovery path between the electronic device 101 and the another electronic device.

The graphs of FIG. 6A and FIG. 6B are merely examples to represent various embodiments. Various embodiments of the present disclosure may cover technical or design modifications on the retransmission and/or the retransmit power, which are well known to those skilled in the art.

Figure 7:
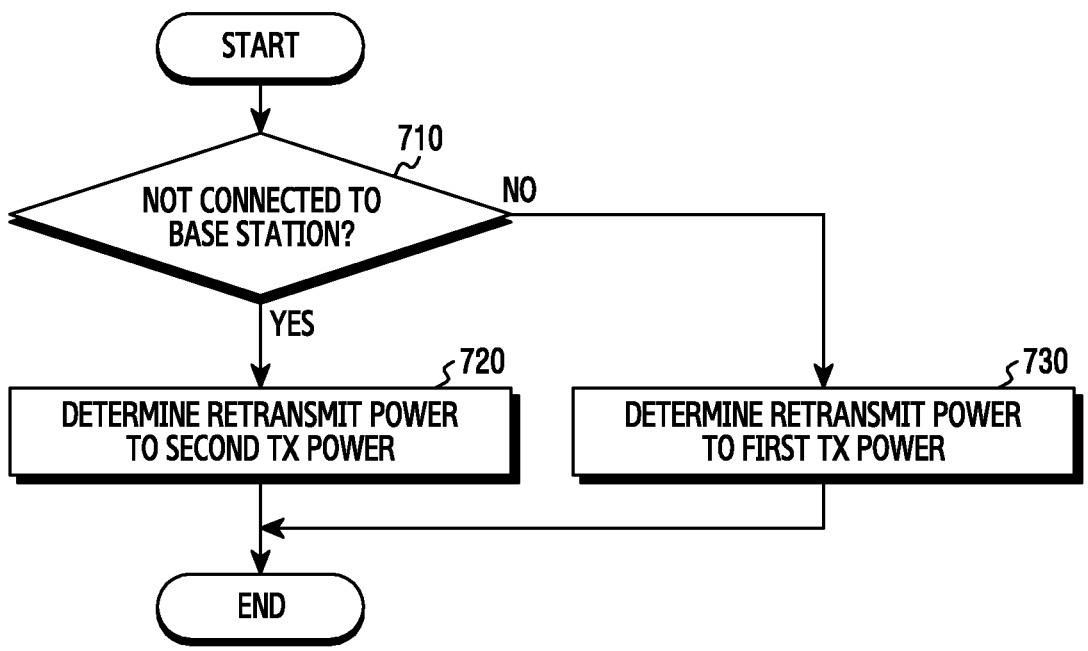
FIG. 7 illustrates an example of operations of an electronic device for determining a retransmit power according to various embodiments.

FIG. 7 illustrates an example of operations of an electronic device for determining a retransmit power according to various embodiments. Such operations may be executed by the electronic device 101 of FIG. 1 or at least one component such as at least one processor of the electronic device 101.

Referring to FIG. 7, in operation 710, the electronic device 101 may identify or determine whether the electronic device 101 is not connected to a base station. For example, in an RRC idle state or outside coverage of the base station (i.e., in the OOC state), the electronic device 101 may identify that it is not connected to the base station. By contrast, in the RRC connection state, the electronic device 101 may identify that it is connected to the base station.

If the electronic device 101 is not connected to the base station, the electronic device 101 may determine a retransmit power of a signal to be transmitted to at least another electronic device via a D2D communication path, to a second Tx power in operation 720. The second Tx power may be lower than the Tx power of the signal to be transmitted to the at least another electronic device via the D2D communication path.

If a plurality of retransmission counts is set in the electronic device 101, the electronic device 101 may determine the retransmit power for at least one of the retransmissions, to the second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, in response to the plurality of the retransmission counts, the second Tx power may vary per retransmission count according to a state of the electronic device 101. For example, if a remaining amount of a battery of the electronic device 101 is a first level, the electronic device 101 may determine a first retransmit power to a (dBm), determine a second retransmit power to b (dBm) which is lower than a, and determine a third retransmit power to c (dBm) which is lower than a and b. For example, if the remaining amount of the battery of the electronic device 101 is a second level which is higher than the first level, the electronic device 101 may determine the first retransmit power to a (dBm), determine the second retransmit power to a (dBm), and determine the third retransmit power to b (dBm) which is lower than a.

The second Tx power may be determined using various methods. In some embodiments, the second Tx power may be one fixed value, among fixed values stored in the electronic device 101, corresponding to the state of the electronic device or an attribute of the signal to transmit. For example, based on the identified or determined OOC state, the electronic device 101 may determine to decrease the retransmit power of the signal to transmit, below the Tx power of the signal to transmit, and determine the retransmit power to decrease, to the fixed value corresponding to the remaining amount of the battery of the electronic device 101 among the multiple fixed values. In some other embodiments, the second Tx power may be calculated and determined using an equation or an algorithm pre-stored in the electronic device 101. For example, based on the RRC idle state identified or determined, the electronic device 101 may determine to decrease the retransmit power of the signal to transmit, below the Tx power of the signal to transmit, and calculate the retransmit power to decrease by inserting a variable indicative of the electronic device state or the transmit signal attribute into the equation or the algorithm.

If the electronic device 101 is connected to the base station, the electronic device 101 may determine the retransmit power of the signal to be transmitted to the at least another electronic device via the D2D communication path, to the first Tx power in operation 730. The first Tx power may be identical to the Tx power of the signal to be transmitted to the at least another electronic device via the D2D communication path. In other words, the first Tx power may be identical to the Tx power determined by the base station to which the electronic device 101 is connected, or identical to the Tx power determined based on the OL power control scheme. That is, the electronic device 101 may not change the Tx power and the retransmit power of the signal to transmit in operation 730.

In some embodiments, unlike FIG. 7, the electronic device 101 may perform operation 720 when it is connected to the base station, and perform operation 730 when it is not connected to the base station. That is, the electronic device 101 may determine the retransmit power of the signal to the second Tx power when it is connected to the base station, and determine the retransmit power of the signal to the first Tx power when it is not connected to the base station.

As such, the electronic device 101 may adaptively determine the retransmit power according to its connection state. If the electronic device 101 may not be controlled from its upper node (e.g., not connected to a base station), the electronic device 101 may determine the retransmit power to be lower than the Tx power, thus reducing its power consumption, obtaining power diversity, and mitigating interference on another device. By contrast, if the electronic device 101 may be controlled from its upper node, the electronic device 101 may determine the retransmit power according to a determination of the upper node, thus reducing resources consumed to determine the retransmit power. The method for determining the retransmit power or the method for adjusting the retransmit power, which does not require additional signaling with another electronic device, may achieve low complexity.

Figure 8:
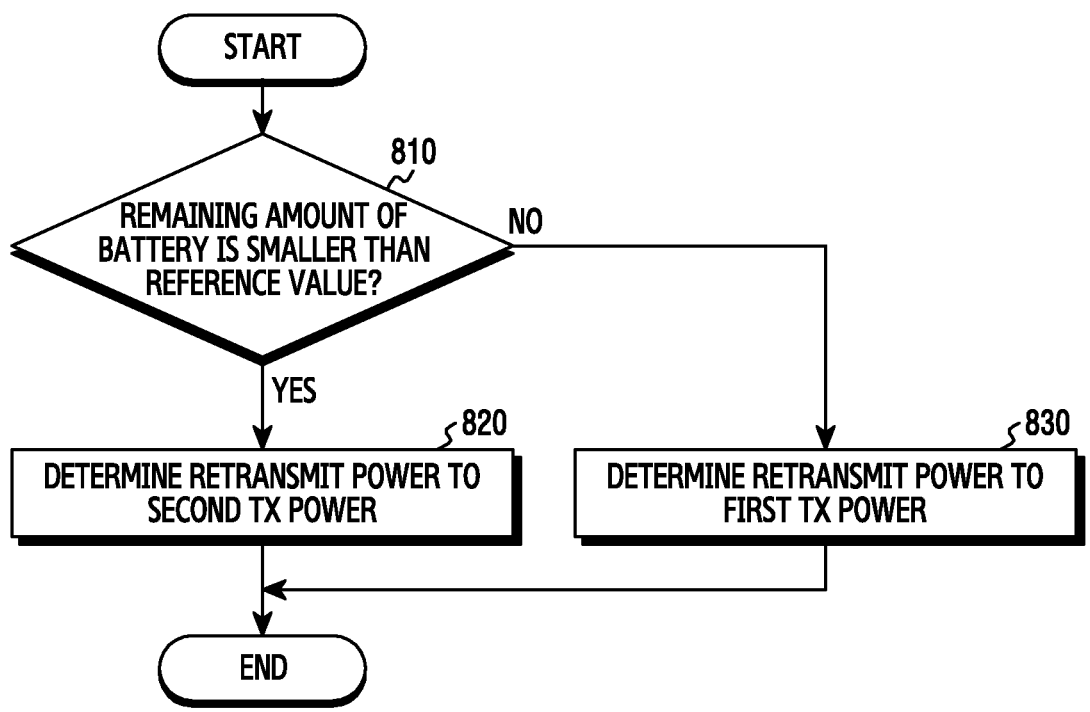
FIG. 8 illustrates another example of operations of an electronic device for determining a retransmit power according to various embodiments.

FIG. 8 illustrates another example of operations of an electronic device for determining a retransmit power according to various embodiments. Such operations may be executed by the electronic device 101 of FIG. 1 or at least one component such as at least one processor of the electronic device 101.

Referring to FIG. 8, in operation 810, the electronic device 101 may determine whether a remaining amount of its battery is smaller than a reference value. The electronic device 101 may determine whether a value indicative of its battery state is smaller than the reference value. In some embodiments, the reference value may be a fixed value pre-stored in the electronic device 101. In some other embodiments, the reference value may change according to an operation state of the electronic device 101. For example, if consuming relatively high power in executing a plurality of applications, the electronic device 101 may change the reference value to a relatively high value. By contrast, in an idle state or in a charging state, the electronic device 101 may change the reference value to a relatively low value.

If the remaining amount of the battery is smaller than the reference value, the electronic device 101 may determine a retransmit power of a signal to be transmitted to at least another electronic device via a D2D communication path, to a second Tx power in operation 820. The second Tx power may be lower than a Tx power of the signal to be transmitted to the at least another electronic device via the D2D communication path.

If a plurality of retransmission counts is set in the electronic device 101, the electronic device 101 may determine the retransmit power for at least one of the retransmissions, to a second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, in response to the plurality of the retransmission counts, the second Tx power may vary per retransmission count according to the state of the electronic device 101. For example, if the remaining amount of the battery of the electronic device 101 is a first level, the electronic device 101 may determine a first retransmit power to a (dBm), determine a second retransmit power to b (dBm) which is lower than a, and determine a third retransmit power to c (dBm) which is lower than a and b. For example, when the remaining amount of the battery of the electronic device 101 is a second level which is higher than the first level, the electronic device 101 may determine the first retransmit power to a (dBm), determine the second retransmit power to a (dBm), and determine the third retransmit power to b (dBm) which is lower than a.

In some embodiments, the second Tx power may be the fixed value which is lower than the Tx power. In some other embodiments, the second Tx power may vary according to the remaining amount of the battery of the electronic device 101. For example, the electronic device 101 may determine the second Tx power to a value corresponding to the remaining amount of the battery of the electronic device 101 among a plurality of predefined values. The plurality of the values may be defined as shown in Table 2.

TABLE 2

| Remaining amount of battery (%) | retransmission power (dBm) |
|---|---|
| 0 < x ≤ 10 | $a_1$ |
| 10 < x ≤ 20 | $a_2$ |
| ... | ... |

For example, the electronic device 101 may calculate the second Tx power to the value corresponding to the remaining amount of the battery of the electronic device 101 using a predefined equation or algorithm.

If the remaining amount of the battery is greater than or equal to the reference value, the electronic device 101 may determine the retransmit power of a signal to be transmitted to the at least another electronic device via the D2D communication path, to the first Tx power in operation 830. The operation 830 may correspond to the operation 730 of FIG. 7.

As such, the electronic device 101 may adaptively determine the retransmit power according to its battery state. If the battery amount of the electronic device 101 is relatively considerable, the electronic device 101 may maintain the same retransmit power as the Tx power. By contrast, if the battery amount of the electronic device 101 is relatively small, the electronic device 101 may determine the retransmit power to be lower than the Tx power, thus reducing its battery consumption. The method for determining the retransmit power or the method for adjusting the retransmit power, which does not require additional signaling with another electronic device, may achieve low complexity.

Figure 9A:
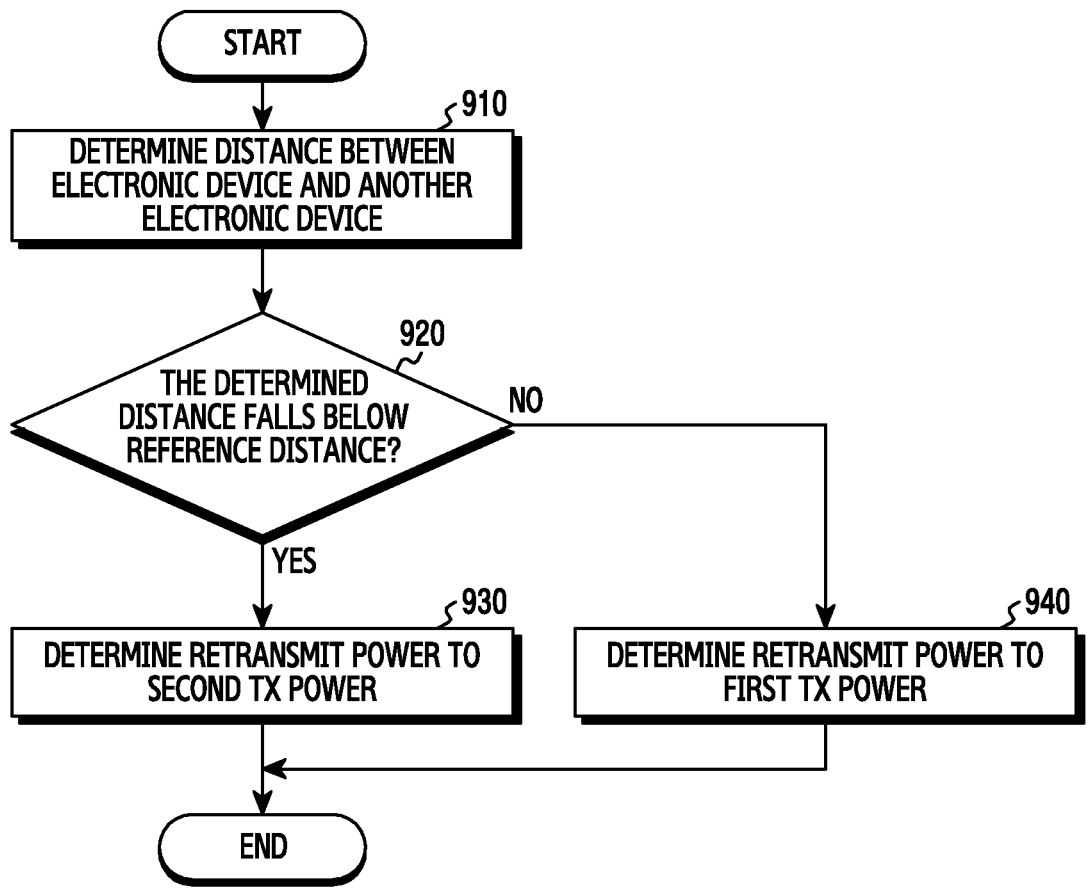
FIG. 9A illustrates yet another example of operations of an electronic device for determining a retransmit power according to various embodiments.

FIG. 9A illustrates yet another example of operations of an electronic device for determining a retransmit power according to various embodiments. Such operations may be executed by the electronic device 101 of FIG. 1 or at least one component such as at least one processor of the electronic device 101.

Referring to FIG. 9A, in operation 910, the electronic device 101 may determine a distance between the electronic device 101 and another electronic device. The electronic device 101 may determine the distance between the electronic device 101 and the another electronic device, based on various parameters. For example, based on a received signal strength (RSS) of a signal received from the another electronic device, the electronic device 101 may determine the distance between the electronic device 101 and the another electronic device. For example, based on the RSS of the signal received from the another electronic device and a transmitted signal strength of the signal, the electronic device 101 may determine the distance between the electronic device 101 and the another electronic device. For example, based on location information (e.g., coordinate information) of the another electronic device in the signal received from the another electronic device, the electronic device 101 may determine the distance between the electronic device 101 and the another electronic device. For example, based on timing advance (TA) information of the another electronic device or TA information of a base station which serves the another electronic device in the signal received from the another electronic device, the electronic device 101 may determine the distance between the electronic device 101 and the another electronic device.

In some embodiments, the electronic device 101 may receive information about power used by the another electronic device, from the another electronic device. The electronic device 101 may determine the distance between the electronic device 101 and the another electronic device, by comparing the power information provided from the another electronic device with power received from the another electronic device.

In operation 920, the electronic device 101 may determine whether the determined distance falls below a reference distance. The reference distance may be a parameter used to determine whether the another electronic device is close to the electronic device. In some embodiments, the reference distance may be a fixed value. In some other embodiments, the reference distance may change according to the state of the electronic device 101.

If the determined distance falls below the reference distance, the electronic device 101 may determine a retransmit power of a signal to be transmitted to the another electronic device via a D2D communication path, to a second Tx power in operation 930. The second Tx power may be lower than a Tx power of the signal to be transmitted to the another electronic device via the D2D communication path.

If a plurality of retransmission counts is set in the electronic device 101, the electronic device 101 may determine the retransmit power for at least one of retransmissions, to the second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, with the plurality of the retransmission counts, the second Tx power may vary per retransmission count according to the state of the electronic device 101. For example, when a remaining amount of a battery of the electronic device 101 is a first level, the electronic device 101 may determine a first retransmit power to a (dBm), determine a second retransmit power to b (dBm) which is lower than a, and determine a third retransmit power to c (dBm) which is lower than a and b. For example, when the remaining amount of the battery of the electronic device 101 is a second level which is higher than the first level, the electronic device 101 may determine the first retransmit power to a (dBm), determine the second retransmit power to a (dBm), and determine the third retransmit power to b (dBm) which is lower than a.

In some embodiments, the second Tx power may be the fixed value which is lower than the Tx power. In some other embodiments, the second Tx power may vary according to the distance between the electronic device 101 and the another electronic device. For example, the electronic device 101 may determine the second Tx power, to a value corresponding to the distance between the electronic device 101 and the another electronic device among a plurality of predefined values. The plurality of the values may be defined as shown in Table 3.

TABLE 3

| distance between electronic device and another electronic device (m) | retransmission power (dBm) |
|---|---|
| 0 < x ≤ 50 | $b_1$ |
| 50 < x ≤ 100 | $b_2$ |
| ... | ... |

For example, the electronic device 101 may calculate the second Tx power to the value corresponding to the distance between the electronic device 101 and the another electronic device by applying a value indicative of the distance between the electronic device 101 and the another electronic device to a predefined equation or algorithm If the distance between the electronic device 101 and the another electronic device exceeds the reference distance, the electronic device 101 may determine the retransmit power of a signal to be transmitted to the another electronic device via the D2D communication path, to the first Tx power in operation 940. The operation 940 may correspond to the operation 730 of FIG. 7.

As such, the electronic device 101 according to various embodiments may adaptively determine the retransmit power according to the distance between the electronic device 101 and the another electronic device. If the another electronic device receiving the signal from the electronic device 101 is located in proximity to the electronic device 101, the electronic device 101 may determine the retransmit power to be lower than the Tx power, thus enhancing a reception rate of the signal. If the another electronic device is away from the electronic device 101 beyond a specified distance, the electronic device 101 may maintain the same retransmit power as the Tx power. The method for determining the retransmit power or the method for adjusting the retransmit power, which does not require additional signaling with the another electronic device, may achieve low complexity.

Figure 9B:
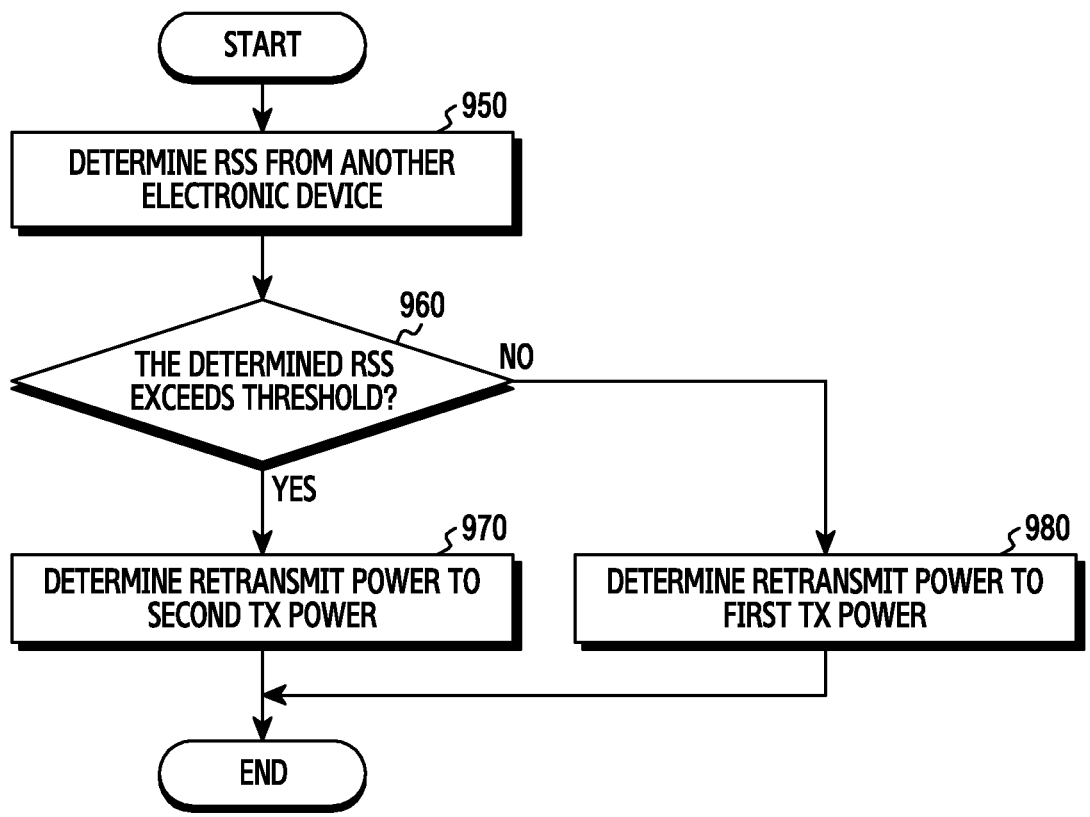
FIG. 9B illustrates still another example of operations of an electronic device for determining a retransmit power according to various embodiments.

FIG. 9B illustrates still another example of operations of an electronic device for determining a retransmit power according to various embodiments. Such operations may be executed by the electronic device 101 of FIG. 1 or at least one component such as at least one processor of the electronic device 101.

Referring to FIG. 9B, in operation 950, the electronic device 101 may determine an RSS from another electronic device. For example, the electronic device 101 may determine the RSS from the another electronic device via a D2D communication path. While the RSS from the another electronic device is determined in FIG. 9B, the electronic device 101 may use various parameters according to embodiments. For example, the electronic device 101 may determine or identify a data rate of traffic delivered via the D2D communication path between the another electronic device and the electronic device 101, or a modulation and coding scheme (MSC) value.

In operation 960, the electronic device 101 may determine whether the determined RSS exceeds a threshold. The threshold may be a parameter used to determine a state of the D2D communication path between the another electronic device and the electronic device 101. In some embodiments, the threshold may be a fixed value. In some other embodiments, the threshold may change according to one or more a state of the electronic device 101, a state of the another electronic device, and the state of the D2D communication path between the another electronic device and the electronic device 101.

If the determined RSS exceeds the threshold, the electronic device 101 may determine a retransmit power of a signal to be transmitted to the another electronic device via the D2D communication path, to a second Tx power in operation 970. The second Tx power may be lower than a Tx power of the signal to be transmitted to the another electronic device via the D2D communication path.

If a plurality of retransmission counts is set in the electronic device 101, the electronic device 101 may determine the retransmit power for at least one of the retransmissions, to the second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, with the plurality of the retransmission counts, the second Tx power may vary per retransmission count according to the state of the electronic device 101. For example, when a remaining amount of a battery of the electronic device 101 is a first level, the electronic device 101 may determine a first retransmit power to a (dBm), determine a second retransmit power to b (dBm) which is lower than a, and determine a third retransmit power to c (dBm) which is lower than a and b. For example, if the remaining amount of the battery of the electronic device 101 is a second level which is higher than the first level, the electronic device 101 may determine the first retransmit power to a (dBm), determine the second retransmit power to a (dBm), and determine the third retransmit power to b (dBm) which is lower than a.

In some embodiments, the second Tx power may be the fixed value which is lower than the Tx power. In some other embodiments, the second Tx power may vary according to the signal strength. For example, the electronic device 101 may determine the second Tx power, to a value corresponding to the signal strength among a plurality of predefined values.

For example, the electronic device 101 may calculate the second Tx power to the value corresponding to the determined signal strength by applying a value indicative of the determined signal strength to a predefined equation or algorithm If the determined signal strength falls below the threshold, the electronic device 101 may determine the retransmit power of the signal to be transmitted to the another electronic device via the D2D communication path, to a first Tx power in operation 980. The operation 980 may correspond to the operation 730 of FIG. 7.

As such, the electronic device 101 according to various embodiments may adaptively determine the retransmit power according to the RSS from the another electronic device. If the signal strength exceeds the threshold, the electronic device 101 may determine the retransmit power to be lower than the Tx power, thus enhancing a reception rate of the signal. If the signal strength falls below the threshold, the electronic device 101 may maintain the same retransmit power as the Tx power. The method for determining the retransmit power or the method for adjusting the retransmit power, which does not require additional signaling with another electronic device, may achieve low complexity.

Figure 10:
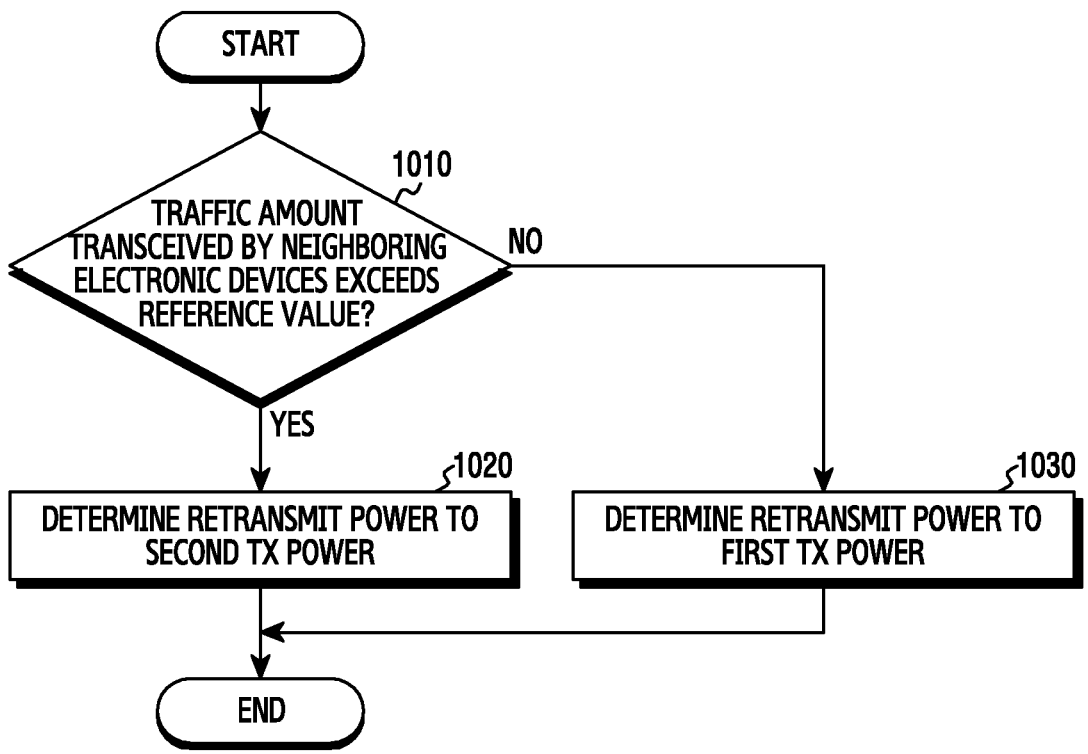
FIG. 10 illustrates a further another example of operations of an electronic device for determining a retransmit power according to various embodiments.

FIG. 10 illustrates a further another example of operations of an electronic device for determining a retransmit power according to various embodiments. Such operations may be executed by the electronic device 101 of FIG. 1 or at least one component such as at least one processor of the electronic device 101.

Referring to FIG. 10, in operation 1010, the electronic device 101 may determine whether an amount of traffic transceived by electronic devices near the electronic device 101 exceeds a reference value. In some embodiments, the electronic device 101 may receive a signal from a base station which services the electronic device 101. The signal may contain information indicative of the traffic amount transceived by the electronic devices near the electronic device 101. Based on the information, the electronic device 101 may determine whether the traffic amount transceived by the electronic devices near the electronic device 101 exceeds the reference value. In some other embodiments, the electronic device 101 may determine a non-intended traffic amount (i.e., an interference amount) received from the neighboring electronic devices of the electronic device 101. The electronic device 101 may determine whether the determined traffic amount exceeds the reference value.

If the determined traffic amount exceeds the reference value, the electronic device 101 may determine a retransmit power of a signal to be transmitted to the another electronic device via the D2D communication path, to a second Tx power in operation 1020. The second Tx power may be lower than the Tx power of the signal to be transmitted to the another electronic device via the D2D communication path.

If a plurality of retransmission counts is set in the electronic device 101, the electronic device 101 may determine the retransmit power for at least one of the retransmissions, to the second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, with the plurality of the retransmission counts, the second Tx power may vary per retransmission count according to the state of the electronic device 101. For example, when a remaining amount of a battery of the electronic device 101 is a first level, the electronic device 101 may determine a first retransmit power to a (dBm), determine a second retransmit power to b (dBm) which is lower than a, and determine a third retransmit power to c (dBm) which is lower than a and b. For example, when the remaining amount of the battery of the electronic device 101 is a second level which is higher than the first level, the electronic device 101 may determine the first retransmit power to a (dBm), determine the second retransmit power to a (dBm), and determine the third retransmit power to b (dBm) which is lower than a.

In some embodiments, the second Tx power may be the fixed value which is lower than the Tx power. In some other embodiments, the second Tx power may vary according to the determined traffic amount. For example, the electronic device 101 may determine the second Tx power, to a value corresponding to the determined traffic amount among a plurality of predefined values. For example, the electronic device 101 may calculate the second Tx power to the value corresponding to the determined traffic amount by applying a value indicative of the determined traffic amount to a predefined equation or algorithm If the determined traffic amount falls below the reference value, the electronic device 101 may determine the retransmit power of the signal to be transmitted to the another electronic device via the D2D communication path, to the first Tx power in operation 1030. The operation 1030 may correspond to the operation 730 of FIG. 7.

As such, the electronic device 101 according to various embodiments may adaptively determine the retransmit power based on the traffic amount transceived by the neighboring electronic devices of the electronic device 101. By adaptively determining the retransmit power based on the traffic amount transceived by the neighboring electronic devices of the electronic device 101, the electronic device 101 may mitigate interference on its neighboring electronic devices. The method for determining the retransmit power or the method for adjusting the retransmit power, which does not require additional signaling with another electronic device, may achieve low complexity.

Figure 11:
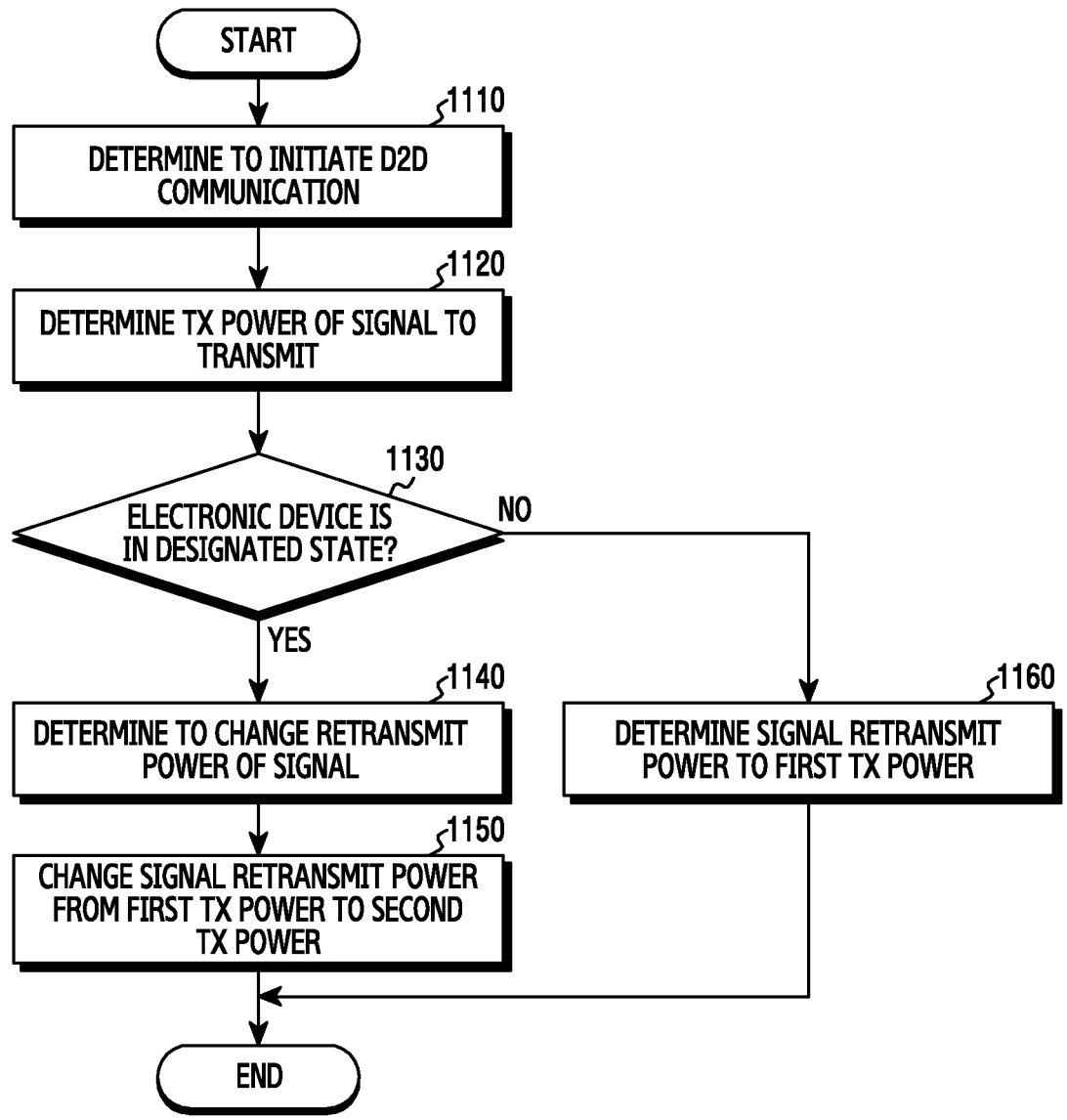
FIG. 11 illustrates operations of a processor of an electronic device according to various embodiments.

FIG. 11 illustrates an example of operations of a processor of an electronic device according to various embodiments. Such operations may be executed at the processor 120 of the electronic device 101 of FIG. 1.

Referring to FIG. 11, in operation 1110, the processor 120 may determine to initiate D2D communication with at least another electronic device. For example, if the electronic device 101 receives information regarding a disaster or an emergency from at least one network entity such as a base station, the processor 120 may determine to initiate the D2D communication with at least another electronic device belonging to the same D2D group as the electronic device 101. For example, in response to communication interruption between the electronic device 101 and the base station, the processor 120 may determine to initiate the D2D communication with the at least another electronic device.

In operation 1120, the processor 120 may determine a Tx power of a signal to be transmitted to the at least another electronic device for the D2D communication. For example, based on a power parameter received from the base station, the processor 120 may determine the Tx power of the signal to be transmitted to the at least another electronic device for the D2D communication. For example, the processor 120 may determine the Tx power of the signal to transmit, based on its autonomous selection.

In various embodiments, the processor 120 may determine the Tx power of the signal to transmit, without considering a specified condition. For example, the processor 120 may randomly allocate the Tx power of the signal, per retransmission count within a specified range. However, it is not limited thereto.

In operation 1130, the processor 120 may identify whether a state of the electronic device 101 is a designated state. The designated state may include one or more of a state where a remaining amount of a battery of the electronic device 101 is smaller than a reference value, a state where the electronic device 101 is not fully connected to a base station, a state where a distance between the electronic device 101 and the at least another electronic device falls below a reference distance, and a state where a traffic amount of neighboring electronic devices of the electronic device 101 exceeds a reference value. In the designated state of the electronic device 101, the processor 120 may perform operation 1140. If the electronic device 101 is not in the designated state, the processor 120 may perform operation 1160.

In response to the designated state of the electronic device 101, the processor 120 may determine to change a retransmit power of the signal in operation 1140.

Based on determining to change the retransmit power of the signal, the processor 120 may change the retransmit power of the signal from a first Tx power to a second Tx power in operation 1150. The first Tx power may be identical to the Tx power determined in the operation 1120. That is, the first Tx power may be a retransmit power defined by current LTE specification. The second Tx power may be smaller than the first Tx power. The second Tx power may be a fixed value which is predetermined, and may adaptively change according to the state of the electronic device 101. For example, the processor 120 may decrease the second Tx power by a value corresponding to the battery level of the electronic device 101. For example, the processor 120 may decrease the second Tx power by a size corresponding to the distance between the electronic device 101 and the another electronic device. For example, the processor 120 may decrease the second Tx power by a value corresponding to the traffic amount incurred by the neighboring devices of the electronic device 101.

If the signal is transmitted multiple times, the processor 120 may change the retransmit power used for at least one of the retransmissions, from the first Tx power to the second Tx power. The number of one or more retransmissions, among the multiple retransmissions, which transmit the signal with the changed retransmit power may adaptively change based on the state of the electronic device 101. For example, with a relatively low battery level of the electronic device 101, the processor 120 may determine the signal retransmission count with the changed retransmit power to be greater than the signal retransmission count with the changed retransmit power during a reference state. By contrast, with a relatively high battery level of the electronic device 101, the processor 120 may determine the signal retransmission count with the changed retransmit power to be smaller than the signal retransmission count with the changed retransmit power during a reference state. In other words, as the remaining amount of the battery reduces, the processor 120 may increase the signal retransmission count with the changed (i.e., reduced) retransmit power.

According to the signal retransmission count, the processor 120 may change the retransmit power to decrease gradually. For example, if the distance between the electronic device 101 and the another electronic device continuously changes or the distance between the electronic device 101 and the another electronic device may not be measured, the processor 120 may change the retransmit power to decrease gradually, according to the signal retransmission count for the sake of transmit diversity.

In response to the designated state of the electronic device 101, the processor 120 may determine the signal retransmit power to a first Tx power in operation 1160. That is, the processor 120 may determine the signal retransmit power according to the current LTE specification. In other words, the processor 120 may maintain the retransmit power with the Tx power determined in the operation 1120.

Figure 12:
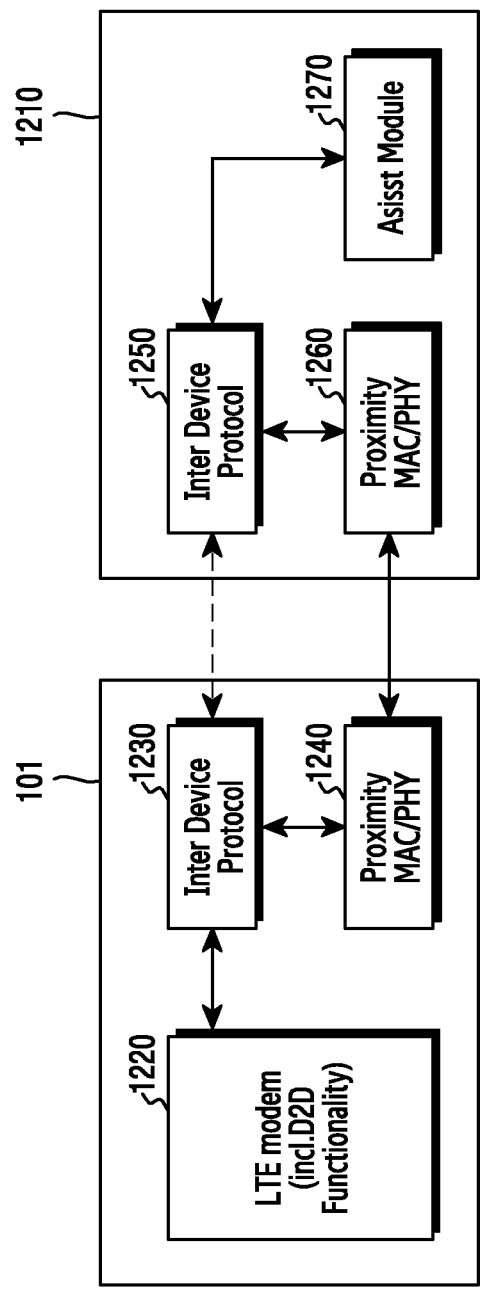
FIG. 12 illustrates functional configuration of a protocol of an electronic device and a first electronic device which is coupled to the electronic device through proximity communication according to various embodiments.

FIG. 12 illustrates functional configuration of a protocol of a first electronic device which is coupled to an electronic device through proximity communication according to various embodiments.

In FIG. 12, a first electronic device 1210 may perform wide area network (WAN) communication or proximity communication with at least another electronic device. The first electronic device 1210 may assist the electronic device 101 in expanding capability of the electronic device 101. If the first electronic device 1210 assists the electronic device 101 in expanding the capability of the electronic device 101, the first electronic device 1210 may be transparent to the at least one electronic device.

The first electronic device 1210 may be any mobile system such as a mobile phone, a smart phone, a music player, a portable game console, a navigation system, a laptop computer, a user device, or a terminal. For example, the first electronic device 1210 may be a smart watch, a wearable device, and so on. The first electronic device 1210 may be a set of electronic devices. In some embodiments, the first electronic device 1210 may operate based on the same identifier as the electronic device 101 or a corresponding identifier.

Referring to FIG. 12, the electronic device 101 may include an LTE modem 1220, an inter device protocol 1230, and a proximity media access control (MAC)/physical layer (PHY) 1240.

The LTE modem 1220 may perform WAN communication. The LTE modem 1220 may include a protocol stack (e.g., MAC, PHY) for supporting broadband communication. For example, the LTE modem 1220 may communicate with a base station. Also, the LTE modem 1220 may conduct D2D communication or discovery. For example, the LTE modem 1220 may perform LTE-D2D communication or LTE-D2D discovery with at least another electronic device.

The inter device protocol 1230 may perform an operation relating to a resource (e.g., an RF resource) used by the electronic device 101. For example, the inter device protocol 1230 may determine whether the electronic device 101 requires more resources. The inter device protocol 1230 may perform an operation (e.g., signal transmission or reception) used by the electronic device 101. For example, the inter device protocol 1230 may identify an operation requested from an upper layer of the electronic device 101, and execute the identified operation. For example, the inter device protocol 1230 may receive information about capability (e.g., a radio resource state, a power consumption state, or a battery level) of the LTE modem 1220, from the LTE modem 1220.

Based on the received capability information of the LTE modem 1220, the inter device protocol 1230 may determine operations to request from the first electronic device 1210. That is, based on the received capability information of the LTE modem 1220, the inter device protocol 1230 may determine operations to be authorized to the first electronic device 1210.

The inter device protocol 1230 may generate a message to transmit to the first electronic device 1210, based on the determined operations. The inter device protocol 1230 may send the generated message to the proximity MAC/PHY 1240.

The proximity MAC/PHY 1240 may be a MAC/PHY region for the proximity communication. For example, the proximity MAC/PHY 1240 may perform the proximity communication using a technique (e.g., Wi-Fi, Bluetooth, etc.) different from the LTE modem 1220. For example, the proximity MAC/PHY 1240 may conduct the proximity communication using the same technique (e.g., LTE-D2D) as the LTE modem 1220. The proximity MAC/PHY 1240 may perform an operation functionally separate from the LTE modem 1220. The proximity MAC/PHY 1240 may transmit the message from the inter device protocol 1230 to the first electronic device 1210.

The first electronic device 1210 may include an inter device protocol 1250, a proximity MAC/PHY 1260, and an assist module 1270.

The proximity MAC/PHY 1260 may be a MAC/PHY region for the proximity communication. For example, the proximity MAC/PHY 1260 may perform the proximity communication using Wi-Fi, Bluetooth, or so on. The proximity MAC/PHY 1260 may provide a message received from the electronic device 101 through the proximity MAC/PHY 1240, to the inter device protocol 1250. Also, the proximity MAC/PHY 1260 may transmit a report message (e.g., a feedback message regarding the requested or authorized operation to the electronic device 101) to the electronic device 101 through the proximity MAC/PHY 1240.

The inter device protocol 1250 may receive a request message or an authorization message from the electronic device 101, from a message fed from the proximity MAC/PHY 1260. The inter device protocol 1250 may command a component (e.g., the assist module 1270) of the first electronic device 1210 to execute the operation according to the received message. The inter device protocol 1250 may provide an outcome of its command to the electronic device 101. In other words, the inter device protocol 1250 may logically (or operatively) communicate with the inter device protocol 1230 of the electronic device 101.

The assist module 1270 may receive whole or part of the request of the electronic device 101, from the inter device protocol 1250. The assist module 1270 may execute various operations based on the received request. For example, the assist module 1270 may include a transmitter for transmitting a D2D signal, and a controller.

The assist module 1270 may provide an outcome of the request of the electronic device 101, to the inter device protocol 1250.

The inter device protocol 1250 may generate a report message based on the outcome from the assist module 1270. The inter device protocol 1250 may forward the generated report message to the proximity MAC/PHY 1260.

The proximity MAC/PHY 1260 may transmit the report message to the electronic device 101 through the proximity MAC/PHY 1240.

The proximity MAC/PHY 1240 may forward the received report message to the inter device protocol 1230. The inter device protocol 1230 may forward the received report message to an upper layer or to the LTE modem 1220.

Figure 13:
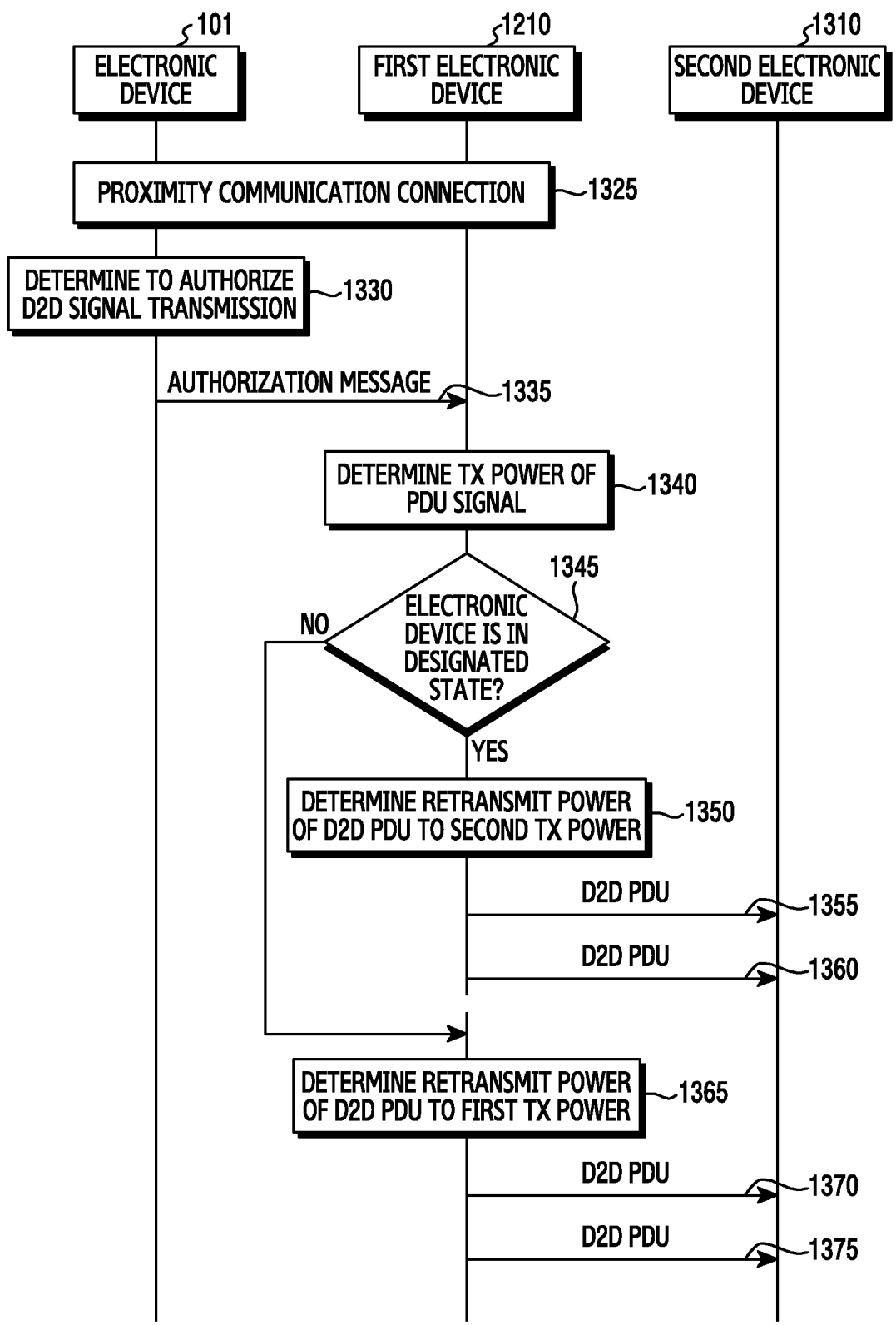
FIG. 13 illustrates signal flows between an electronic device which transmits a D2D signal through a first electronic device, and the first electronic device according to various embodiments.

FIG. 13 illustrates signal flows between an electronic device which transmits a D2D signal through a first electronic device, and the first electronic device according to various embodiments, which may be generated by the electronic device 101 of FIG. 1 and/or the first electronic device 1210 of FIG. 12.

Referring to FIG. 13, in operation 1325, the electronic device 101 and the first electronic device 1210 may establish proximity communication connection. For example, the electronic device 101 and the first electronic device 1210 may establish the proximity communication connection using at least one of the inter device protocol 1230, the proximity MAC/PHY 1240, the inter device protocol 1250, and the proximity MAC/PHY 1260.

In operation 1330, the electronic device 101 may determine to authorize D2D packet data unit (PDU) transmission to the first electronic device 1210. The D2D PDU transmission may include at least one of D2D discovery signal transmission and D2D communication signal transmission. Without sufficient resources, for example, without an RF chain due to communications with the at least another electronic device, the electronic device 101 may determine to authorize the D2D PDU transmission to the first electronic device 1210. Also, by comparing battery levels of the electronic device 101 and the first electronic device 1210 according to a difference of the power used for the transmission and the power used for the reception, the electronic device 101 may determine to authorize the D2D PDU transmission to the first electronic device 1210. For example, based on battery level information of the first electronic device 1210 received from the first electronic device 1210, the electronic device 101 may compare its battery level with the battery level of the first electronic device 1210. Based on the comparison result, the electronic device 101 may determine to authorize the D2D PDU transmission to the first electronic device 1210.

In operation 1335, the electronic device 101 may transmit an authorization message to the first electronic device 1210. The authorization message may include information about the D2D PDU to be transmitted from the electronic device 101 to a second electronic device 1310. Also, the authorization message may include information about a resource for transmitting the D2D PDU. The resource information may be obtained using various methods. For example, the electronic device 101 may obtain the resource information by receiving system information block (SIB) from its serving base station. For example, the electronic device 101 may transmit a message requesting the resource for transmitting the D2D PDU, to the serving base station, and thus obtain the resource information for the D2D PDU transmission from the serving base station. For example, the electronic device 101 may acquire the resource information based on a pre-configured criterion. The first electronic device 1210 may receive the resource information from the electronic device 101.

In operation 1340, the first electronic device 1210 may determine a Tx power for the D2D PDU transmission, based on the authorization message. The first electronic device 1210 may determine the Tx power of the D2D PDU to be transmitted to the second electronic device 1310 via a D2D communication path. The determined Tx power may be a Tx power used for initial transmission from the first electronic device 1210 to the second electronic device 1310 via the D2D communication path.

In some embodiments, if the electronic device 101 is fully connected to a cellular network, the first electronic device 1210 may determine the Tx power of the D2D PDU, based on the resource information for the D2D communication which is allocated by the serving base station of the electronic device 101 to the electronic device 101.

In some other embodiments, if the electronic device 101 is not fully connected to the cellular network, the first electronic device 1210 may determine the Tx power of the D2D PDU, based on a resource determined by selection of the electronic device 101 (i.e., autonomous selection).

In operation 1345, the first electronic device 1210 may determine whether it is in a designated state. The designated state may include at least one of a state where a remaining amount of a battery of the electronic device 101 is smaller than a reference value, a state where a distance between the first electronic device 1210 and the second electronic device 1310 falls below a reference distance, and a state where a traffic amount of other electronic devices near the first electronic device 1210 or the second electronic device 1310 exceeds a reference value.

In the designated state, the first electronic device 1210 may determine a retransmit power of the D2D PDU, to a second Tx power in operation 1350. The second Tx power may be lower than the Tx power of D2D PDU to be transmitted to the second electronic device 1310 via the D2D communication path.

If a plurality of retransmission counts is set in the first electronic device 1210, the first electronic device 1210 may determine the retransmit power for at least one of the retransmissions, to the second Tx power. In this case, the retransmit power for the other retransmissions, except for the at least one retransmission determined with the second Tx power, may be determined to a first Tx power. The first Tx power may be identical to the Tx power of the signal to be transmitted to the at least another electronic device via the D2D communication path.

Also, with the plurality of the retransmission counts in the first electronic device 1210, the second Tx power may vary per retransmission count according to the state of the first electronic device 1210. For example, when a remaining amount of a battery of the first electronic device 1210 is a first level, the electronic device 101 may determine a first retransmit power to a (dBm), determine a second retransmit power to b (dBm) which is lower than a, and determine a third retransmit power to c (dBm) which is lower than a and b. For example, when the remaining amount of the battery of the first electronic device 1210 is a second level which is higher than the first level, the first electronic device 1210 may determine the first retransmit power to a (dBm), determine the second retransmit power to a (dBm), and determine the third retransmit power to b (dBm) which is lower than a.

In some embodiments, the second Tx power may be the fixed value which is lower than the Tx power. In some other embodiments, the second Tx power may vary according to the state of the first electronic device 1210. For example, the first electronic device 1210 may determine the second Tx power, to a value corresponding to its state among a plurality of predefined values. For example, the first electronic device 1210 may calculate the second Tx power to the value corresponding to its state using a predefined equation or algorithm In operation 1355, the first electronic device 1210, in lieu of the electronic device 101, may transmit the D2D PDU with the determined Tx power. The first electronic device 1210 may be transparent to the second electronic device 1310. That is, the first electronic device 1210, as the electronic device 101, may transmit the D2D PDU to the second electronic device 1310 with the determined Tx power. The second electronic device 1310 may receive the D2D PDU.

In operation 1360, the first electronic device 1210, in lieu of the electronic device 101, may transmit the D2D PDU with the determined retransmit power. The first electronic device 1210 may be transparent to the second electronic device 1310. That is, the first electronic device 1210, as the electronic device 101, may transmit the D2D PDU to the second electronic device 1310 with the determined retransmit power. The second electronic device 1310 may receive the retransmitted D2D PDU.

If the first electronic device 1210 is not in the designated state, the first electronic device 1210 may determine the retransmit power of the D2D PDU, to the first Tx power in operation 1365. The operation 1365 may correspond to the operation 730 of FIG. 7.

In operation 1370, the first electronic device 1210, in lieu of the electronic device 101, may transmit the D2D PDU with the determined Tx power. The first electronic device 1210 may be transparent to the second electronic device 1310. That is, the first electronic device 1210, as the electronic device 101, may transmit the D2D PDU to the second electronic device 1310 with the determined Tx power. The second electronic device 1310 may receive the D2D PDU.

In operation 1375, the first electronic device 1210, in lieu of the electronic device 101, may transmit the D2D PDU with the determined retransmit power. The first electronic device 1210 may be transparent to the second electronic device 1310. That is, the first electronic device 1210, as the electronic device 101, may transmit the D2D PDU to the second electronic device 1310 with the determined retransmit power. The second electronic device 1310 may receive the retransmitted D2D PDU.

As such, if the electronic device 101 lacks the resource for communicating with the at least another electronic device or the remaining amount of the battery of the electronic device 101 is insufficient, the electronic device 101 may authorize its D2D transmission to the first electronic device 1210 which is associated with the electronic device 101. By adaptively determining the retransmit power according to the state of the first electronic device 1210, the first electronic device 1210 may reduce the power consumption of the electronic device 101 or the first electronic device 1210 and mitigate the interference caused by the first electronic device 1210. Also, by adaptively determining the retransmit power according to the state of the electronic device 101 or the first electronic device 1210, the first electronic device 1210 may obtain the transmit diversity or the required reception rate.

Figure 14:
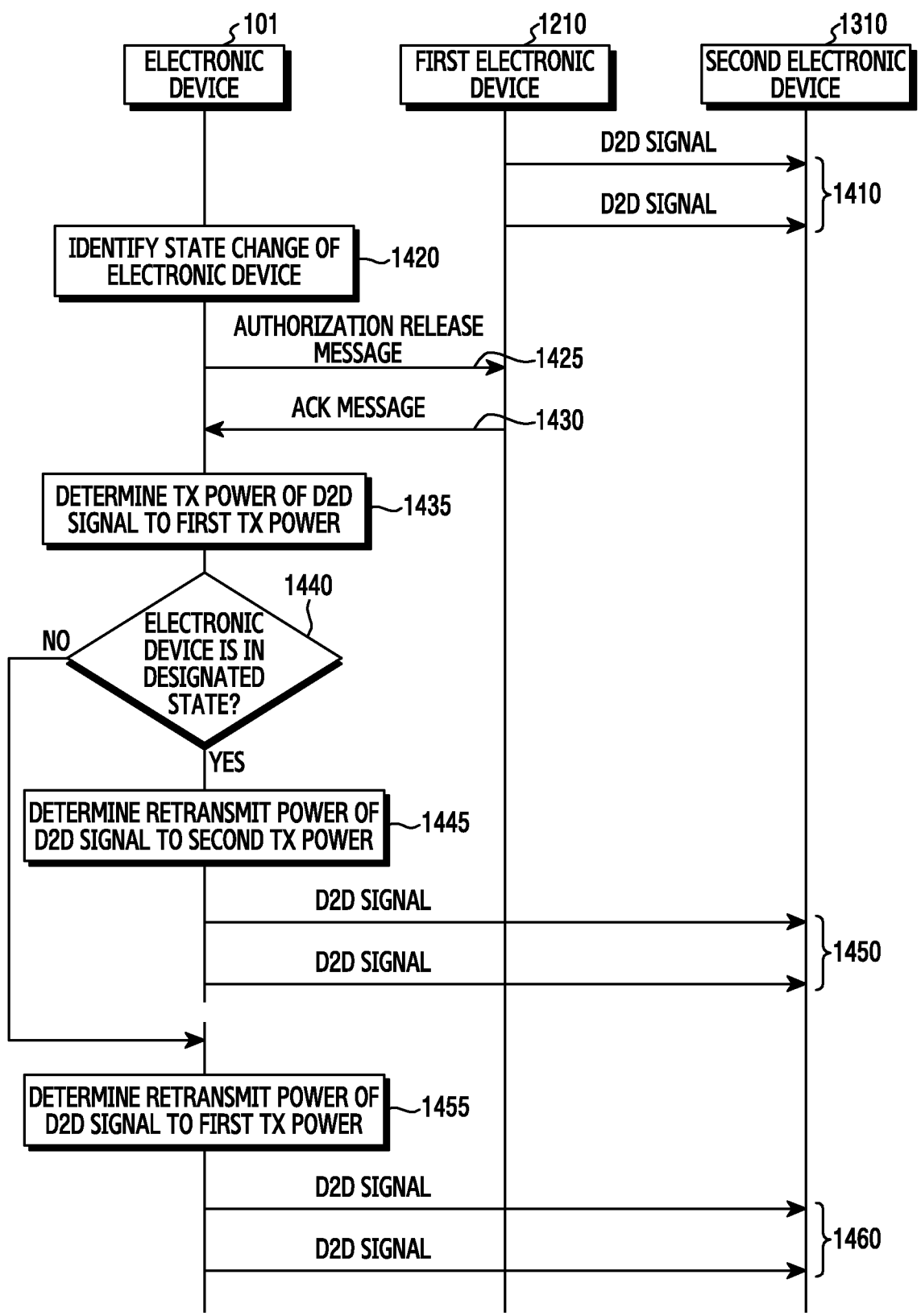
FIG. 14 illustrates signal flows between an electronic device which releases D2D transmission authorization of a first electronic device, and the first electronic device according to various embodiments.

FIG. 14 illustrates signal flows between an electronic device which releases D2D transmission authorization of a first electronic device, and the first electronic device according to various embodiments, which may be generated by the electronic device 101 of FIG. 1 and/or the first electronic device 1210 of FIG. 12.

Referring to FIG. 14, in operation 1410, the first electronic device 1210 may transmit a D2D signal to the second electronic device 1310 based on D2D transmission authorization of the electronic device 101. The operation 1410 may correspond to at least one of the operations 1355, 1360, 1370, or 1375 of FIG. 13.

In operation 1420, the electronic device 101 may identify its state change. For example, based on determining sufficient resources or a relatively good battery state of the electronic device 101, the electronic device 101 may identify its state change.

In operation 1425, the electronic device 101 may transmit a message for releasing the D2D transmission authorization, to the first electronic device 1210. The message for releasing the D2D transmission authorization may be transmitted via a proximity communication path between the electronic device 101 and the first electronic device 1210. The first electronic device 1210 may receive the message for releasing the D2D transmission authorization.

In operation 1430, the first electronic device 1210 may transmit an acknowledgement (ACK) message indicating that the message for releasing the D2D transmission authorization is successfully received, to the electronic device 101. The ACK message may be transmitted via the proximity communication path. The electronic device 101 may receive the ACK message.

In operation 1435, the electronic device 101 may determine a Tx power of a D2D signal, to a first Tx power. The first Tx power may be defined according to LTE specification. In some embodiments, in response to determining that the electronic device 101 transmits the D2D signal, the electronic device 101 may determine the Tx power of the D2D signal, to the first Tx power.

In operation 1440, the electronic device 101 may determine whether it is in a designated state. The designated state may include one or more of a state where a remaining amount of a battery of the electronic device 101 is smaller than a reference value, a state where the electronic device 101 is not fully connected to a base station, a state where a distance between the electronic device 101 and the at least another electronic device falls below a reference distance, and a state where a traffic amount of other electronic devices near the electronic device 101 exceeds a reference value.

In the designated state, the electronic device 101 may determine a retransmit power of the D2D signal, to a second Tx power in operation 1445. The second Tx power may be lower than the Tx power determined in the operation 1435. The second Tx power may be a fixed value which is predetermined, and may adaptively change according to the state of the electronic device 101. For example, the electronic device 101 may decrease the second Tx power by a value corresponding to its battery level. For example, the electronic device 101 may decrease the second Tx power by a value corresponding to the distance between the electronic device 101 and the at least another electronic device. For example, the electronic device 101 may decrease the second Tx power by a size corresponding to the traffic amount incurred by the neighboring devices of the electronic device 101.

If the signal is transmitted multiple times, the electronic device 101 may change the retransmit power used for at least one of the retransmissions, from the first Tx power to the second Tx power. The number of one or more retransmissions which transmit the signal with the changed retransmit power among the multiple retransmission may adaptively change based on the state of the electronic device 101. For example, with a relatively low battery level of the electronic device 101, the electronic device 101 may determine the signal retransmission count with the changed retransmit power to be greater than the signal retransmission count with the changed retransmit power during a reference state. By contrast, with a relatively high battery level of the electronic device 101, the electronic device 101 may determine the signal retransmission count with the changed retransmit power to be smaller than the signal retransmission count with the changed retransmit power during a reference state. In other words, as the remaining amount of the battery reduces, the electronic device 101 may increase the signal retransmission count with the changed (i.e., reduced) retransmit power.

According to the signal retransmission count, the electronic device 101 may change the retransmit power to decrease gradually. For example, if the distance between the electronic device 101 and the at least another electronic device continuously changes or the distance between the electronic device 101 and the at least another electronic device may not be measured, the electronic device 101 may change the retransmit power to decrease gradually, according to the signal retransmission count for the sake of transmit diversity.

In operation 1450, the electronic device 101 may repeatedly transmit the D2D signal to the second electronic device 1301 based on the determined Tx power and the determined retransmit power.

If the electronic device 101 is not in the designated state, the electronic device 101 may determine the retransmit power of the D2D signal, to the first Tx power in operation 1455. In other words, the electronic device 101 may determine the retransmit power to be identical to the Tx power determined in the operation 1435.

In operation 1460, the electronic device 101 may repeatedly transmit the D2D signal to the second electronic device 1301 based on the determined Tx power and the determined retransmit power.

As mentioned above, a method of an electronic device according to various embodiments may include accessing a base station in at least one frequency band including a transmit frequency band and a receive frequency band, transmitting, via a device-to-device (D2D) communication path to at least another electronic device, a signal with a first Tx power in the Tx frequency band, and, if the signal is retransmitted one or more times, re-transmitting, via the D2D communication path to the at least another electronic device, the signal with a second Tx power lower than the first Tx power, in the Tx frequency band.

In some embodiments, retransmitting the signal may include retransmitting, via the D2D communication path to the at least another electronic device, the signal with the second Tx power if a remaining amount of a battery of the electronic device is less than a reference value. The method of the electronic device may further include retransmitting, via the D2D communication path to the at least another electronic device, the signal with the first Tx power if the remaining amount of the battery of the electronic device is greater than or equal to the reference value.

In some embodiments, the method may further include retransmitting the signal with the second Tx power if a received signal strength from the at least another electronic device exceeds a threshold.

In some embodiments, the method may further include retransmitting, via the D2D communication path to the at least another electronic device, the signal with the second Tx power, based on operating in a state where the electronic device is not accessed to a base station. The method may further include retransmitting, via the D2D communication path to the at least another electronic device, the signal with the first Tx power, based on operating in a state where the electronic device is accessed to the base station.

In some embodiments, retransmitting the signal may include retransmitting the signal with the second Tx power, if a distance between the electronic device and the at least another electronic device is less than a reference distance. The method of the electronic device may further include determining the distance, based on another signal received via the D2D communication path from the at least another electronic device, and retransmitting the signal with the first Tx power, if the distance is greater than or equal to the reference distance. The another signal may include information regarding a timing at which the at least another electronic device transmits the another signal, and determining the distance may include determining the distance, based on the information regarding the timing. The another signal may include information for indicating an area within which the at least another electronic device is located, and determining the distance may include determining the distance, based on the information for indicating the area. The another signal may include information for indicating a transmitted signal strength of the another electronic device, and determining the distance may include determining the distance, based on a difference value between the transmitted signal strength and a received signal strength of the another signal.

In some embodiments, the signal may include control information regarding user data to be transmitted to at least another electronic device via the D2D communication path. The signal may be transmitted with the first Tx power over a PSCCH and retransmitted with the second Tx power over the PSCCH.

In some embodiments, the signal may include user data. The signal may be transmitted with the first Tx power over a PSSCH and retransmitted with the second Tx power over the PSSCH.

In some embodiments, the signal may include control information regarding user data to be transmitted to at least another electronic device, and the method of the electronic device may further include transmitting another signal including the user data to the at least another electronic device with a third Tx power via the D2D communication path, and retransmitting another signal including the user data to the at least another electronic device via the D2D communication path with a fourth Tx power which is lower than the third power. The third Tx power may be lower than the first Tx power, and the fourth Tx power may be lower than the second Tx power.

An electronic device and a method according to various embodiments may reduce power consumption of retransmission in D2D communication by controlling a Tx power in the D2D communication.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the present device over the communication network.

In the specific embodiments of the present disclosure, the elements included in the disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element, and the elements expressed in the singular form may be configured as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a transceiver; and
a processor operably coupled to the transceiver and configured to:
determine to execute a scheme that re-transmits a same signal directly to at least one another electronic device for a device-to-device (D2D) communication, and based on the determination:
control the transceiver to transmit, via a D2D communication path to the at least one another electronic device, a first signal with a first transmit (Tx) power; and
control the transceiver to re-transmit, via the D2D communication path to the at least one another electronic device, a second signal that is a same as the first signal with a first retransmit power and a second retransmit power, the first retransmit power lower than the first Tx power and the second retransmit power lower than the first retransmit power, wherein the first retransmit power and the second retransmit power are adaptively determined according to a state of the electronic device.

2. The electronic device of claim 1, wherein the processor is configured to:
based on the determination and an identification that a remaining amount of a battery of the electronic device is less than a reference value, control the transceiver to re-transmit, via the D2D communication path to the at least one another electronic device, the second signal with the first retransmit power or the second retransmit power.

3. The electronic device of claim 2, wherein the processor is further configured to:
based on the determination and an identification that the remaining amount of the battery of the electronic device is greater than or equal to the reference value, control the transceiver to re-transmit, via the D2D communication path to the at least one another electronic device, the second signal with the first Tx power.

4. The electronic device of claim 1, wherein the processor is configured to:
control the transceiver to re-transmit, via the D2D communication path to the at least one another electronic device, the second signal with the first retransmit power or the second retransmit power based on operating in a state where the electronic device is not accessed to a base station and the determination.

5. The electronic device of claim 4, wherein the processor is further configured to control the transceiver to re-transmit, via the D2D communication path to the at least one another electronic device, the second signal with the first Tx power based on operating in a state where the electronic device is accessed to the base station and the determination.

6. The electronic device of claim 1, wherein the processor is configured to control the transceiver to re-transmit, via the D2D communication path to the at least one another electronic device, the second signal with the first retransmit power or the second retransmit power based on an identification that a distance between the electronic device and the at least one another electronic device is less than a reference distance and the determination.

7. The electronic device of claim 6, wherein the processor is further configured to:
determine, based on another signal received via the D2D communication path from the at least one another electronic device, the distance; and
control the transceiver to re-transmit the second signal with the first Tx power, based on the determination and an identification that the distance is greater than or equal to the reference distance.

8. The electronic device of claim 7, wherein:
the another signal includes information regarding a timing at which the at least one another electronic device transmits the another signal, and
the processor is configured to determine the distance based on the information regarding the timing.

9. The electronic device of claim 7, wherein:
the another signal includes information for indicating an area within which the at least one another electronic device is located, and
the processor is configured to determine the distance based on the information for indicating the area.

10. The electronic device of claim 7, wherein:
the another signal includes information for indicating a transmitted signal strength of the another electronic device, and
the processor is configured to determine the distance based on a difference value between the transmitted signal strength and a received signal strength of the another signal.

11. A method executed in an electronic device with a transceiver, the method comprising:
determining to execute a scheme that re-transmits a same signal directly to at least one another electronic device for a device-to-device (D2D) communication; and
based on the determination:
transmitting, via a D2D communication path to the at least one another electronic device, a first signal with a first transmit (Tx) power; and
re-transmitting, via the D2D communication path to the at least one another electronic device, a second signal that is a same as the first signal with a first retransmit power and a second retransmit power, the first retransmit power lower than the first Tx power and the second retransmit power lower than the first retransmit power,
wherein the first retransmit power and the second retransmit power are adaptively determined according to a state of the electronic device.

12. The method of claim 11, wherein re-transmitting the second signal comprises:
based on the determination and an identification that a remaining amount of a battery of the electronic device is less than a reference value, re-transmitting, via the D2D communication path to the at least one another electronic device, the second signal with the first retransmit power or the second retransmit power.

13. The method of claim 12, further comprising:
based on the determination and an identification that the remaining amount of the battery of the electronic device is greater than or equal to the reference value, re-transmitting, via the D2D communication path to the at least one another electronic device, the second signal with the first Tx power.

14. The method of claim 11, wherein re-transmitting the second signal comprises re-transmitting, via the D2D communication path to the at least one another electronic device, the second signal with the first retransmit power and the second retransmit power based on operating in a state where the electronic device is not accessed to a base station and the determination.

15. The method of claim 14, further comprising:
re-transmitting, via the D2D communication path to the at least one another electronic device, the second signal with the first Tx power based on operating in a state where the electronic device is accessed to the base station and the determination.

16. The method of claim 11, wherein re-transmitting the second signal comprises re-transmitting, via the D2D communication path to the at least one another electronic device, the second signal with the first retransmit power and the second retransmit power based on an identification that a distance between the electronic device and the at least one another electronic device is less than a reference distance and the determination.

17. The method of claim 16, further comprising:
determining, based on another signal received via the D2D communication path from the at least one another electronic device, the distance; and
re-transmitting the second signal with the first Tx power based on the determination and an identification that the distance is greater than or equal to the reference distance.

18. The method of claim 17, wherein:
the another signal includes information regarding a timing at which the at least one another electronic device transmits the another signal, and
determining the distance comprises determining the distance based on the information regarding the timing.

19. The method of claim 17, wherein:
the another signal includes information for indicating an area within which the at least one another electronic device is located, and
determining the distance comprises determining the distance based on the information for indicating the area.

20. The method of claim 17, wherein:
the another signal includes information for indicating a transmitted signal strength of the another electronic device, and
re-transmitting the second signal comprises determining the distance based on a difference value between the transmitted signal strength and a received signal strength of the another signal.

* * * * *